United States Patent [19]
Kai et al.

[11] Patent Number: 5,559,574
[45] Date of Patent: Sep. 24, 1996

[54] IMAGE MOVEMENT CORRECTING DEVICE EFFECTING IMAGE MOVEMENT CORRECTION DEPENDING ON POSITION OF CENTER OF ROTATION OF ANGULAR FLUCTUATION

[75] Inventors: Tadao Kai, Kawasaki; Etsuo Tanaka, Tokyo; Akira Katayama, Koganei, all of Japan

[73] Assignee: Nikon Corporation, Tokyo, Japan

[21] Appl. No.: 547,411

[22] Filed: Oct. 24, 1995

Related U.S. Application Data

[63] Continuation of Ser. No. 156,926, Nov. 24, 1993, abandoned, which is a continuation of Ser. No. 900,491, Jun. 18, 1992, abandoned.

[30] Foreign Application Priority Data

Jun. 21, 1991 [JP] Japan .................................. 3-177214

[51] Int. Cl.$^6$ .................................................. G03B 13/00
[52] U.S. Cl. .......................... 354/400; 354/430; 354/202; 348/208
[58] Field of Search .......................... 354/70, 76, 195.1, 354/195.12, 202, 400, 430; 348/208; 359/554–556, 567

[56] References Cited

U.S. PATENT DOCUMENTS 4,713,697 12/1987 Gotou et al. .............................. 358/222
5,012,347 4/1991 Fournien .................................. 358/222
5,243,462 9/1993 Kobayashi et al. ...................... 359/557

FOREIGN PATENT DOCUMENTS

| | | |
|---|---|---|
| 62-47012 | 2/1987 | Japan . |
| 2-120821 | 5/1990 | Japan . |
| 2-183217 | 7/1990 | Japan . |
| 2-234115 | 9/1990 | Japan . |
| 2-230114 | 9/1990 | Japan . |
| 4-328534 | 11/1992 | Japan . |

*Primary Examiner*—David M. Gray
*Assistant Examiner*—J. K. Han
*Attorney, Agent, or Firm*—Shapiro and Shapiro

[57] ABSTRACT

This specification discloses an image movement correcting device for a photographing apparatus for appropriately judging a variation in the amount of image movement correction by the difference in the position of the center of rotation, and effecting accurate image movement correction. Any angular fluctuation of the optical axis of the photographing apparatus is detected by angular displacement detecting means, and when on the basis of the angular fluctuation, image movement correction on a photographing image field is effected by image movement correcting means, the amount of image movement correction by the image movement correcting means is varied in conformity with the position of the center of rotation discriminated by rotation center position discriminating means for discriminating the position of the center of rotation of the angular fluctuation during the photographing by the photographing apparatus.

58 Claims, 18 Drawing Sheets

IMAGE MOVEMENT CORRECTING DEVICE EFFECTING IMAGE MOVEMENT CORRECTION DEPENDING ON POSITION OF CENTER OF ROTATION OF ANGULAR FLUCTUATION

This is a continuation of application Ser. No. 08/156,926 filed Nov. 24, 1993, which is a continuation of application Ser. No. 07/900,491 filed Jun. 18, 1992, both now abandoned.

BACKGROUND OF THE INVENTION

1. Field of the Invention

This invention relates to an image movement correcting device for a photographing apparatus which corrects image movement during photographing.

2. Related Background Art

In photographing apparatuses typified by cameras, as image movement correcting device for detecting the angular fluctuation of an optical axis caused by hand vibration or the like to thereby correct photographed images, there are known a device which effects the bending of a light flux by a variable vertical angle prism (Japanese Laid-Open Patent Application No. 2-120821) and a device which effects image correction by the shifting of a photo-taking optical system (Japanese Laid-Open Patent Application No. 2-183217).

SUMMARY OF THE INVENTION

As regards the image movement of a photographing apparatus, as shown, for example, in FIG. 17 of a accompanying drawings, there are considered various modes such as a case where the photographing apparatus rotates about the entrance portion of a photo-taking lens and the center of the surface of film moves (Case 1), a case where the photographing apparatus rotates about the center of the surface of the film and the entrance portion of the entrance portion of the photo-taking lens moves (Case 2), and a case where the photographing apparatus rotates about a predetermined location from the center of the surface of the film and the entrance portion of the photo-taking lens and the center of the surface of the film move (Case 3).

In the aforedescribed devices, however, the center of rotation of the angular variation of the optical axis is not discriminable and therefore, with regard to the angular fluctuation in any of Cases 1 to 3 shown in FIG. 17, only the same correction can be effected.

In the former device (Japanese Laid-Open Patent Application No. 2-120821), when the detected angle of rotation of the optical axis is θ, the vertical angle of the variable vertical angle prism in the entrance portion is varied to thereby effect the correction for bending the light flux by θ. Such correction is effective when the object is nearly at infinity, but cannot be said to be appropriate when the object is at a short distance, because when as in Case 2 or Case 3, the entrance portion of the photo-taking lens in which the variable vertical angle prism is located moves in a direction perpendicular to the optical axis, the angle of incidence of the object light onto the variable vertical angle prism becomes different.

Also in the latter device (Japanese Laid-Open Patent Application No. 2-183217), besides the angular fluctuation of the optical axis, the principal point of the photo-taking optical system moves in a direction perpendicular to the optical axis, whereby not only the image movement by the angular fluctuation of the optical axis but also the image movement component by the movement of the principal point is superposed. Accordingly, as in the case of the aforedescribed variable vertical angle prism, there has been the disadvantage that the amount of image movement correction cannot be primarily determined for the amount of angular fluctuation of the optical axis.

In the case of hand, the camera eyepiece portion bears against the photographer's face and therefore, usually the rear end portion of the camera is not greatly displaced. By contrast, in the case of wind vibration of the camera on a tripod, usually the tripod mounting portion is not greatly displaced. Accordingly, in a situation in which vibration occurs, some portion of the camera (in the above-described example, the tripod seat or the supported region such as the rear end portion of the camera) can be regarded as being scarcely displaced.

That is, if the supported situation of the camera can be discriminated, it will be possible to specify the position of the center of rotation of the optical axis (the position which is not displaced), and correction taking into account any fluctuation of the angle of incidence of the object light onto the variable vertical angle prism caused by the rotation of the optical axis or the parallel movement of the principal point of the photo-taking optical system will become possible.

Accordingly, it is the object of the present invention to overcome the above-noted disadvantages peculiar to the prior-art image movement correcting device having detecting means for detecting any angular fluctuation and to provide an image movement correcting device for a photographing apparatus which can appropriately judge any variation in the amount of image movement correction caused by the difference in the position of the center of rotation and accomplish accurate image movement correction.

In order to solve the above-noted problems, the image movement correcting device for a photographing apparatus according to the present invention can be of a construction which is provided with angular displacement detecting means for detecting any angular fluctuation of the optical axis of the photographing apparatus, image movement correcting means for effecting image movement correction on a photographing image field, rotation center position discriminating means for discriminating the position of the center of rotation of the angular fluctuation during the photographing by the photographing apparatus, and image movement correction control means for controlling the amount of image movement correction by said image movement correcting means on the basis of the angular fluctuation detected by said angular displacement detecting means and the position of the center of rotation discriminated by said rotation center position discriminating means.

In this case, said rotation center position discriminating means may be a support point detecting switch having an electrical contact adapted to be closed by pressing.

Also, said support point detecting switch may be disposed in an eyepiece portion.

Further, said rotation center position discriminating means may be a mounting detecting switch disposed on the tripod mounting portion of the photographing apparatus for detecting that a tripod has been mounted on the photographing apparatus.

Furthermore, said rotation center position discriminating means may be a pressure-sensitive sensor disposed on the outer surface of the housing of the photographing apparatus and capable of specifying the position of a pressing point.

On the other hand, said image movement correcting means may be a variable vertical angle prism device disposed in the entrance portion of a photo-taking optical system, and said support point detecting switch may be disposed near said variable vertical angle prism device.

Also, said image movement correcting means may be a shift device capable of shifting the photo-taking optical system and the image field relative to each other, and said support point detecting switch may be disposed near the principal point of said photo-taking optical system.

According to the present invention, the supported position of the photographing apparatus can be detected and therefore, the position of the center of rotation of the optical axis can be specified. Accordingly, by detecting any angular fluctuation of the optical axis, the image movement by the rotation of the photo-taking optical system can of course be eliminated and also, by multiplying the distance between the position of the center of rotation and the entrance portion of the photo-taking lens (the portion in which the variable vertical angle prism is disposed) or the principal point position of the photo-taking optical system by an angle of rotation, the amount of movement of the entrance portion of the photo-taking lens or the principal point of the photo-taking optical system in a direction perpendicular to the optical axis can be calculated. Therefore, accurate image movement correction from which any influence caused by said movement is eliminated can be effected.

DESCRIPTION OF THE PREFERRED EMBODIMENTS

Figure 1:
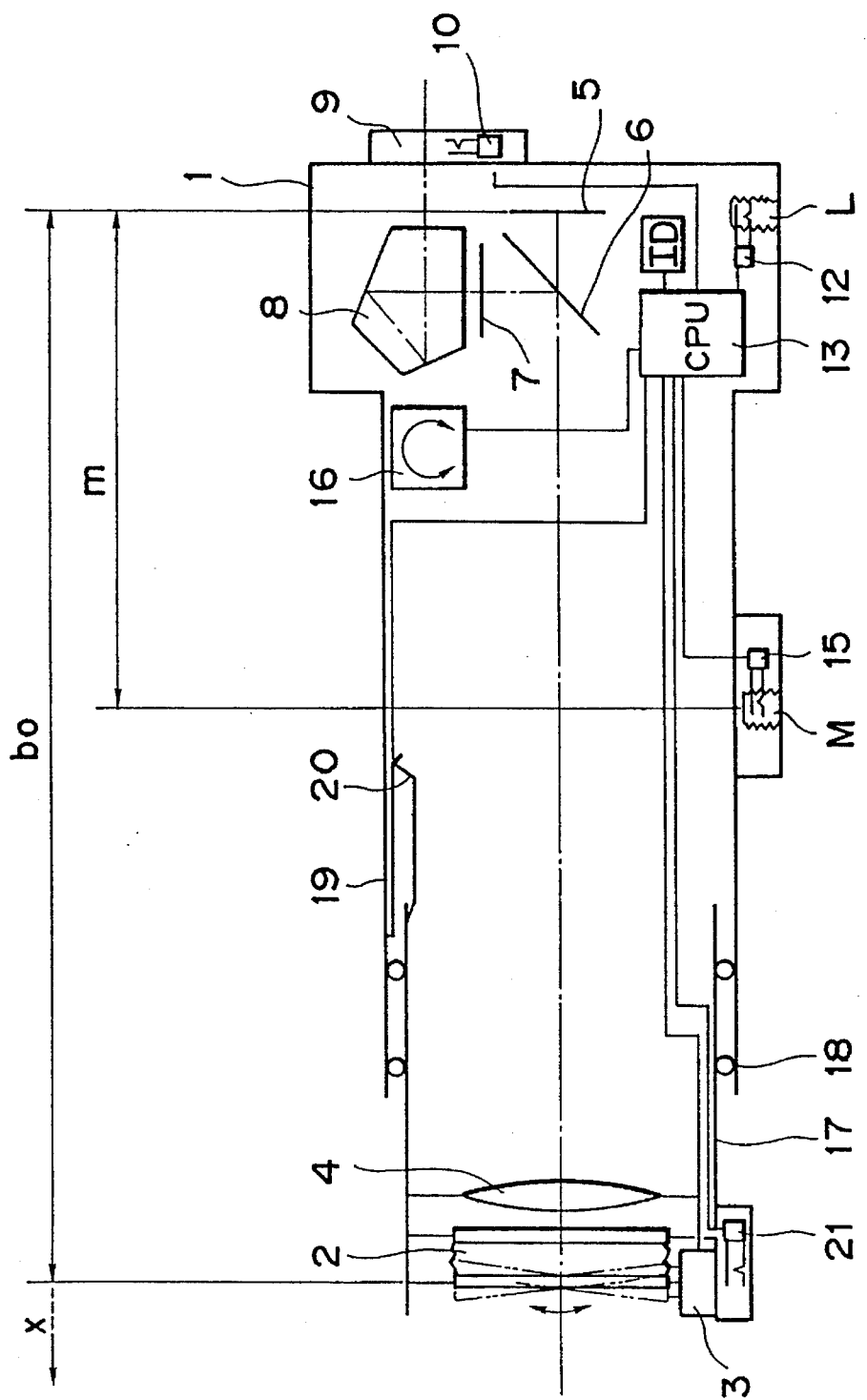
FIG. 1 is a schematic view showing a first embodiment of an image movement correcting device for a photographing apparatus according to the present invention.

The present invention will now be described in greater detail with respect to some embodiments thereof. FIG. 1 is a schematic view showing a first embodiment of an image movement correcting device for a photographing apparatus according to the present invention. The first embodiment is one in which as image movement correcting means, a variable vertical angle prism is disposed in the entrance portion of a photo-taking optical system.

A housing 1 is the housing of a camera body and a lens barrel, and on the front side thereof, an axially movable barrel 17 is supported for movement in the direction of the optical axis by balls 18. In this axially movable barrel 17, there are provided a variable vertical angle prism 2 in which the angle formed between an entrance surface and an exit surface (the vertical angle) is variable, a prism driving unit 3 for changing the vertical angle of the variable vertical angle prism 2, and a photo-taking lens 4 of a focal length f.

The object light passed through the variable vertical angle prism 2 and the photo-taking lens 4 is reflected by a quick return mirror 6, whereafter it is projected onto a finder screen 7 and is observed in an eyepiece portion 9 through a pentagonal prism 8. During photographing, the quick return mirror 6 is moved up and is controlled by a shutter device, not shown, and exposure is effected on photographing film 5.

On the housing 1, there are provided a tripod seat L just beneath the photographing film 5, and a tripod seat M intermediately of the lens barrel.

A camera CPU 13 is a central processing unit which memorizes therein various parameters of the camera (such as the focal length f of the photo-taking lens 4, etc.) and effects a series of photographing operations and control such as image movement correction, and has connected thereto the outputs from an eyepiece portion switch 10, a tripod seat L switch 12, a tripod seat M switch 15 and an entrance portion switch 21, and the camera CPU 13 is designed to be capable of detecting the closing of each of these switches.

The eyepiece portion switch 10 is a switch adapted to be closed when the photographer's face bears against the eyepiece portion 9. The tripod seat L switch 12 is a switch adapted to be closed when a tripod is mounted on the tripod seat L. The tripod seat M switch 15 is a switch adapted to be closed when the tripod is mounted on the tripod seat M. The entrance portion switch 21 is a switch provided just beneath the variable vertical angle prism 2 and adapted to be closed when it bears against a support.

The outputs of an angular displacement detecting unit 16 and a linear encoder 19 are also connected to a camera CPU 13. The angular displacement detecting unit 16 is fixed to the housing 1 for detecting the angular variation θ of the photographing optical axis. The linear encoder 19 is for detecting the amount of axial movement x by a linear encoder brush 20 which is provided on the axially movable barrel 17 coming into sliding contact therewith.

On the other hand, the output of the camera CPU 13 is connected to the prism driving unit 3, which drives the variable vertical angle prism 2 on the basis of the control signal of the camera CPU 13 so that the vertical angle of the variable vertical angle prism 2 may be a predetermined angle.

FIG. 1 shows the case of infinity photographing, and the distance from the photographing film 5 to the variable vertical angle prism 2 is b0, and the distance from the photographing film 5 to the tripod seat M is m. These distances b0 and m and the focal length f of the photo-taking lens 4 are memorized in a memory in the camera CPU 13.

Here, description will be made of the setting of the position of the center of rotation of the optical axis discriminated by rotation center position discriminating means (camera CPU 13) according to the present invention and the calculation of the amount of correction of the bending of the incident light flux of the variable vertical angle prism 2 corrected by image movement correction control means (camera CPU 13).

Figure 2:
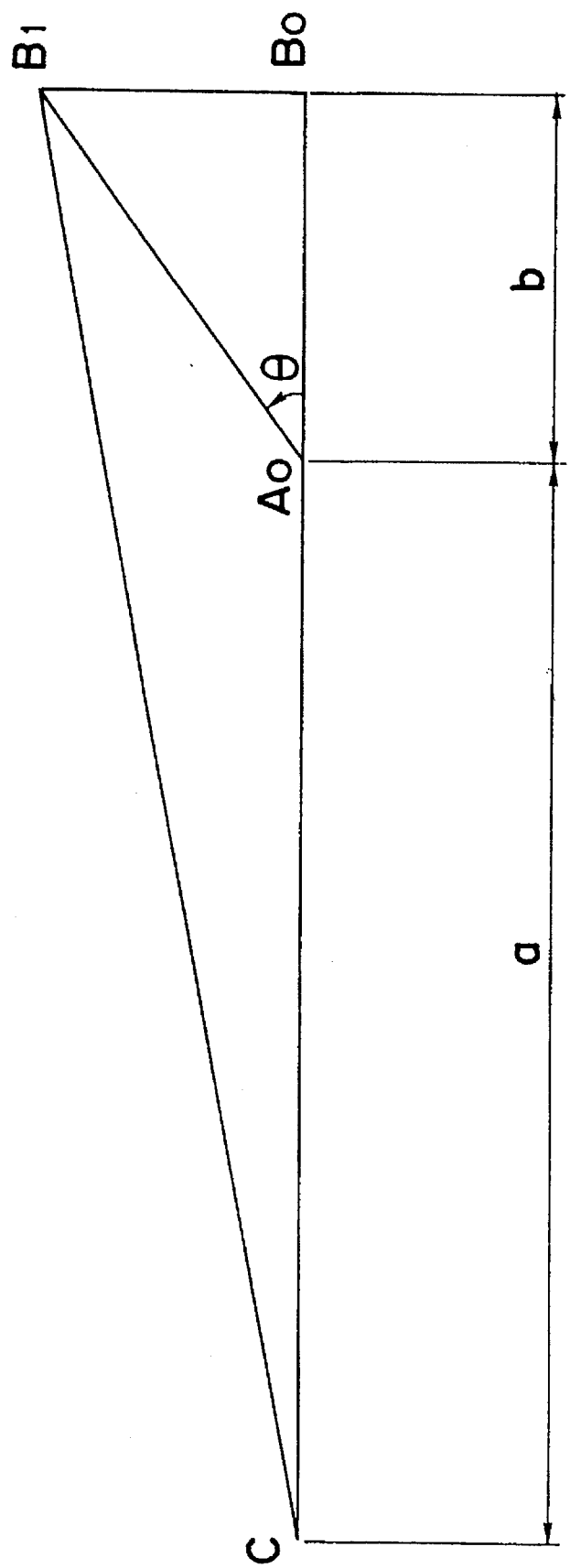
FIG. 2 illustrates the angle of correction of incident light relative to the rotational movement of the optical axis of the photographing apparatus when the object is at a finite distance.
Figure 17:
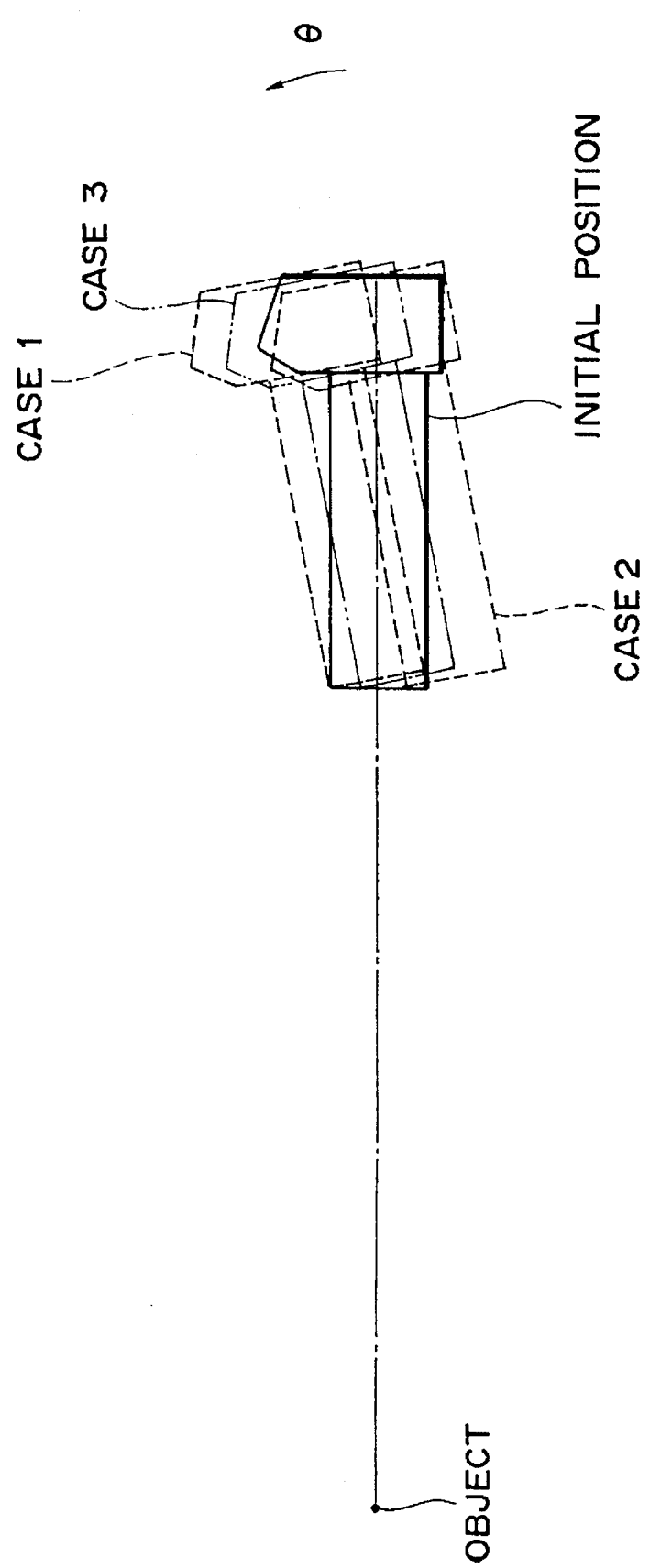
FIG. 17 shows various ways of movement of a photographing apparatus.

FIG. 2 is a diagram illustrating Case 1 shown in FIG. 17. In FIG. 2, a point B0 is the center of the surface of the film, a point A0 is the entrance portion of the photo-taking lens (in which the variable vertical angle prism 2 is disposed), and a point C is the position of the object. The points B0, A0 and C are located on a straight line. Here, let it be assumed that the distance between the points C and A0 is a and the distance between the points A0 and B0 is b. What has been described just above is the initial state.

Now, let it be assumed that the camera has rotated by θ about the entrance portion (A0) of the photo-taking lens and the center of the surface of the film has moved to a point B1. The angle θ is regarded as being slight and is handled as cos θ= 1, and the straight line B0 A0 C and the straight line B0 B1 are regarded as being perpendicular to each other. As is apparent from FIG. 2, the angle of bend (ω) of the light flux by the variable vertical angle prism 2 for eliminating any image movement is given by the following equation:

$$\omega=\theta \tag{1}$$

Figure 3:
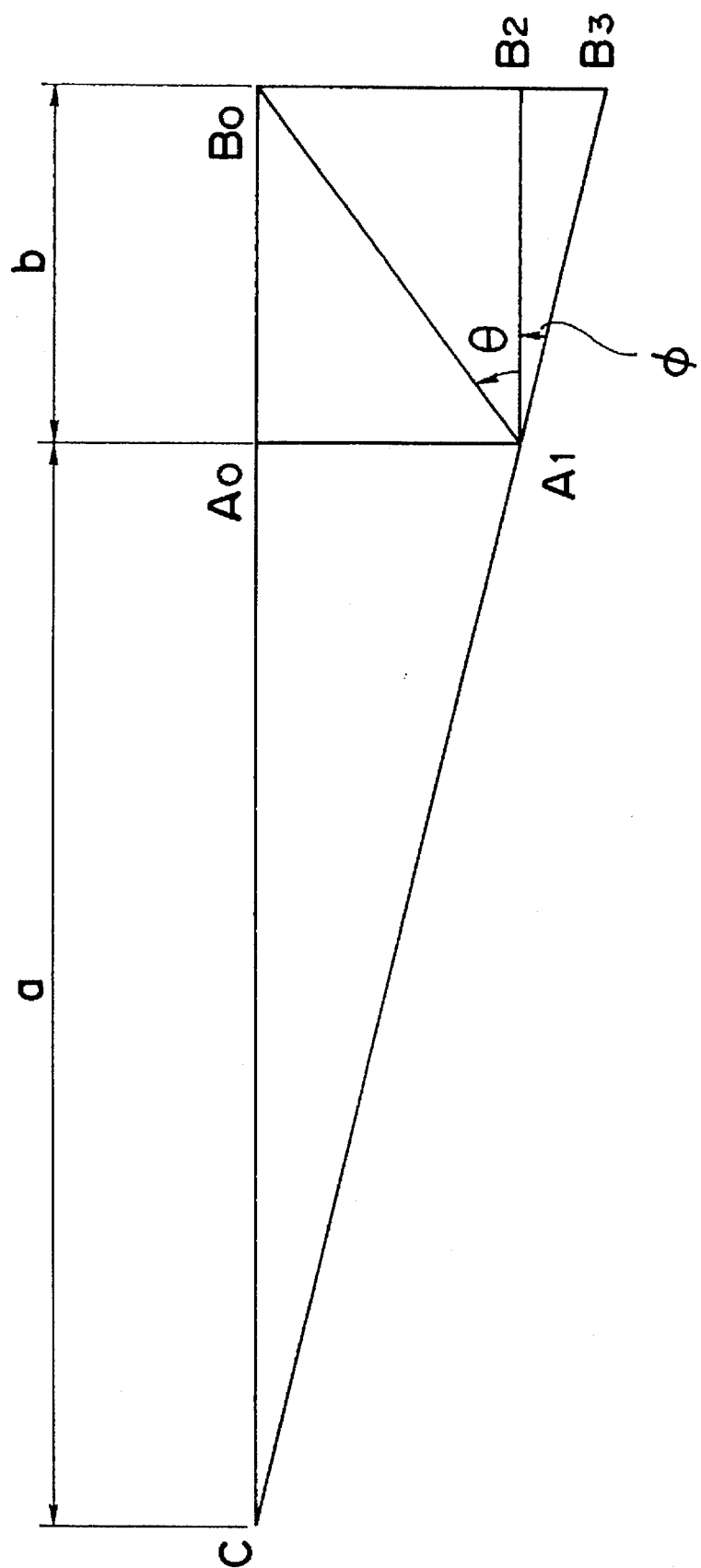
FIG. 3 illustrates the angle of correction of incident light relative to the rotational movement of the optical axis of the photographing apparatus when the object is at a finite distance.

FIG. 3 is a diagram illustrating Case 2 shown in FIG. 17. Here, suppose a case where the camera has rotated by θ about the point B0 at the center of the surface of the film and the entrance portion of the photo-taking lens has moved from the point A0 to a point A1. As is apparent from FIG. 3, the angle of bend ω of the light flux by the variable vertical angle prism 2 for eliminating any image movement is given by the following equation:

$$\omega=\theta+\phi \tag{2}$$

Here, several auxiliary points are set to find the angle φ. A point B2 is a point spaced apart by a distance b from the point A1 in parallelism to a straight line A0 B0, and the points B2, A1, A0 and B0 together form a rectangle. A point B3 is the point of intersection between the extension of a straight line B0 B2 and the extension of a straight line C A1. The angle φ is <B3 A1 B2. Since a straight line A1 B2 and a straight line C A0 B0 are parallel to each other, <A1 C A0 also is the angle φ.

Next, considering the straight line A1 A0, the following equations are obtained:

A0 B0.θ= A0 C.φ b.θ= a.φ

$$\phi=\theta \cdot b/a \tag{3}$$

Accordingly, equation (2) can be rewritten as follows:

$$\omega=\theta \cdot (1+b/a) \tag{4}$$

Figure 4:
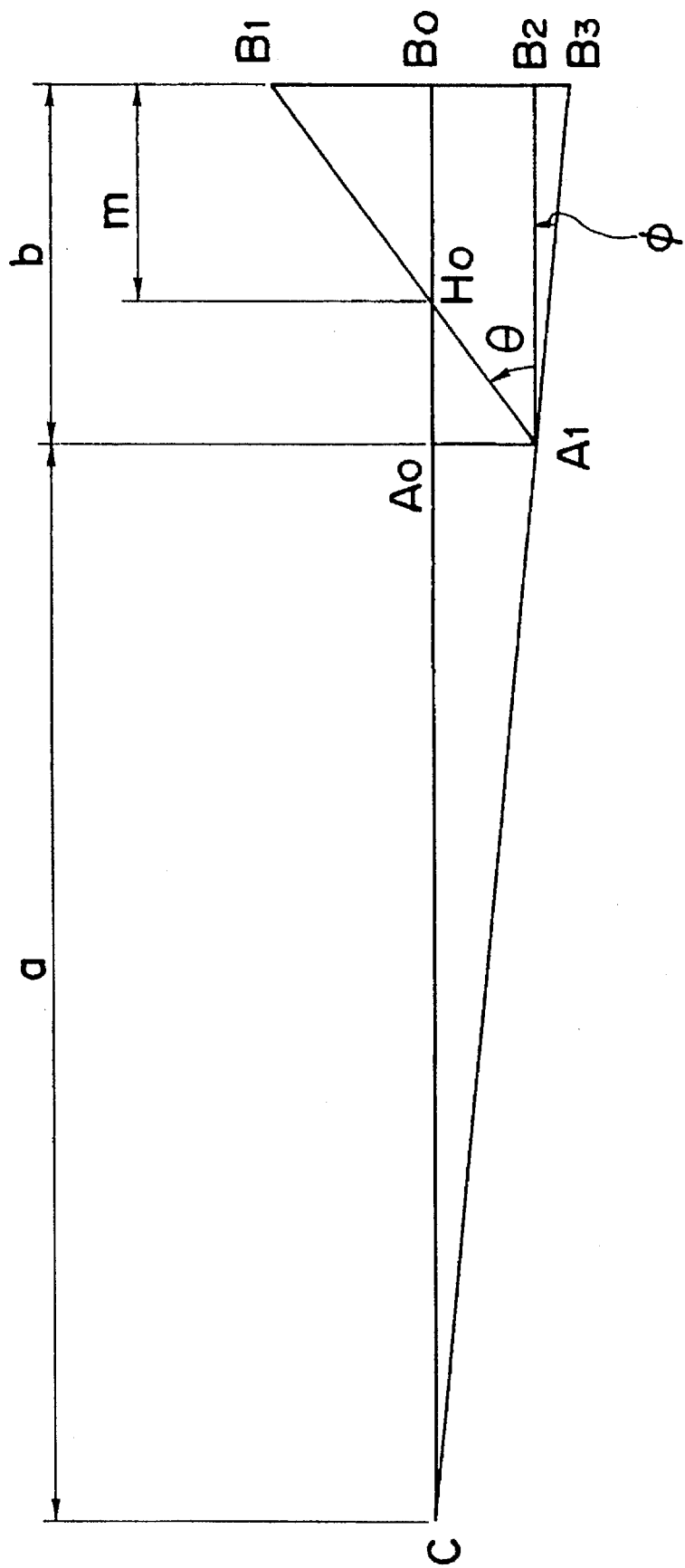
FIG. 4 illustrates the angle of correction of incident light relative to the rotational movement of the optical axis of the photographing apparatus when the object is at a finite distance.

FIG. 4 is a diagram illustrating Case 3 shown in FIG. 17. Here, suppose a case where a camera has rotated by θ about a point H0 lying at a distance m from the point B0 at the center of the surface of the film and the entrance portion of the photo-taking lens (the initial position A0) has moved to a point A1. That is, the center of the surface of the film moves from the point B0 to a point B1. As is apparent from FIG. 4, the angle of bend ω of the light flux by the variable vertical angle prism 2 for eliminating any image movement can be found from equation (2).

Here, auxiliary points B2 and B2 similar to those in FIG. 3 are set and φ is found. Again in FIG. 4, ∠B3 A1 B2=∠A1 C A0 and this is the angle φ. Also, ∠A0 H0 A1 is the angle θ. Paying attention to A0 A1 as in FIG. 3, the following equations are obtained:

A0 H0.θ= A0 C.φ

(b−m).θ= a.φ

$$\phi=\theta \cdot (b-m)/a \tag{5}$$

Accordingly, in the case of FIG. 4, equation (2) can be rewritten as follows:

$$\omega=\theta \cdot \{1+(b-m)/a\} \tag{6}$$

If in equation (6), m=0 is substituted for, equation (6) will become equivalent to equation (4), and if m=b is substituted for, equation (6) will become equivalent to equation (1).

Figure 5:
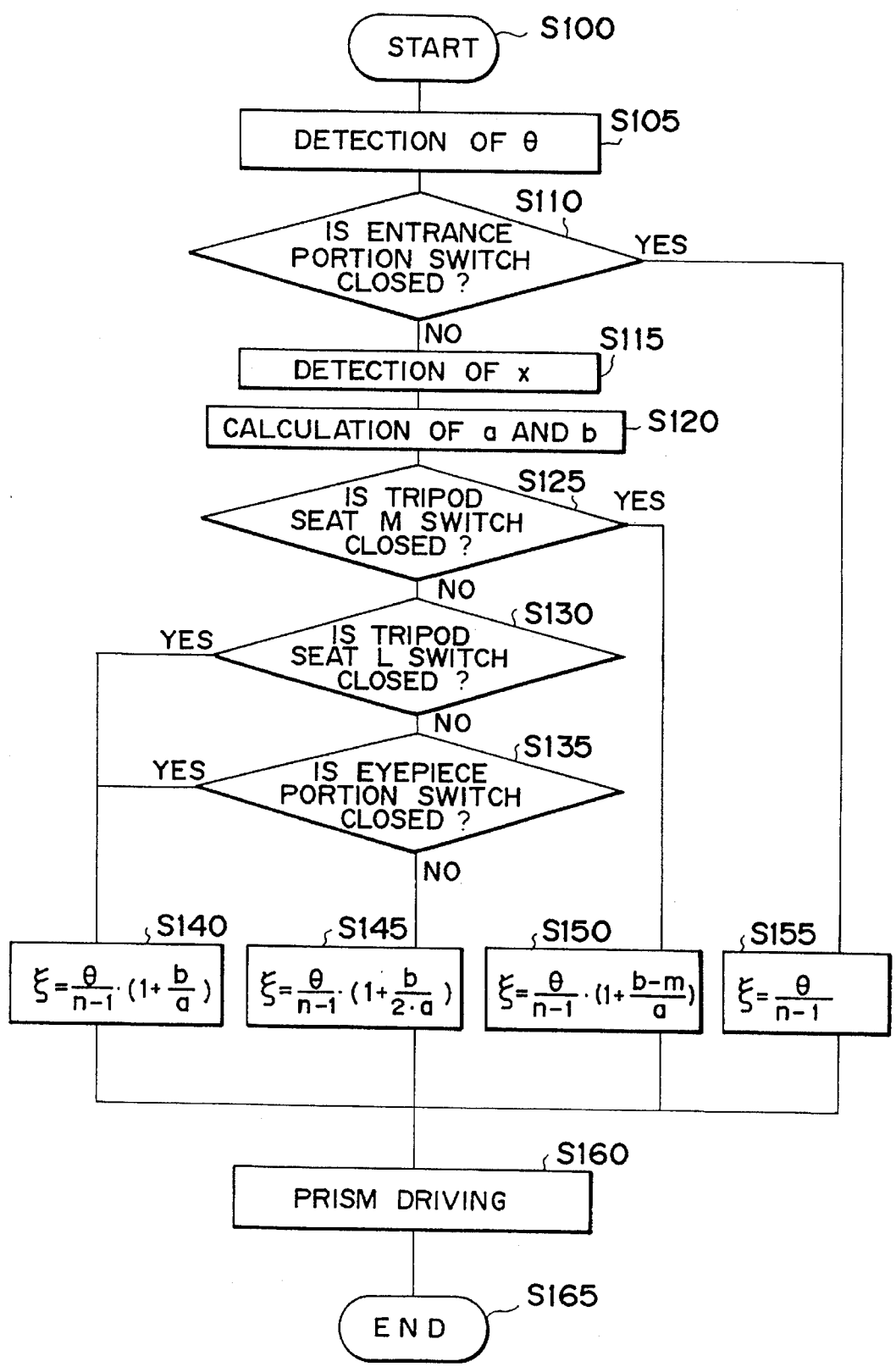
FIG. 5 is a flowchart illustrating the sequence of the operation of the first embodiment shown in FIG. 1.

The operation of the first embodiment will now be described with reference to FIG. 5. FIG. 5 is a flow chart illustrating the sequence of the operation of the first embodiment of the image movement correcting device for a photographing apparatus according to the present invention. Unless otherwise specified, it is to be understood that the operation is processed by the camera CPU 13.

Start is made from a step (hereinafter abbreviated as S) 100, and at S105, an angular displacement output θ is input from the angular displacement detecting unit 16. Next, at S110, whether the entrance portion switch 21 is closed is discriminated. If the switch 21 is closed, advance is made to S155, and if the switch 21 is not closed, advance is made to S115.

At S115, the photo-taking lens axial movement amount output x is input from the linear encoder 19. Subsequently, at S120, a and b shown in FIGS. 2–4 are calculated by the use of the photo-taking lens axial movement amount output x and the prememorized focal length f and distance b0.

Figure 6:
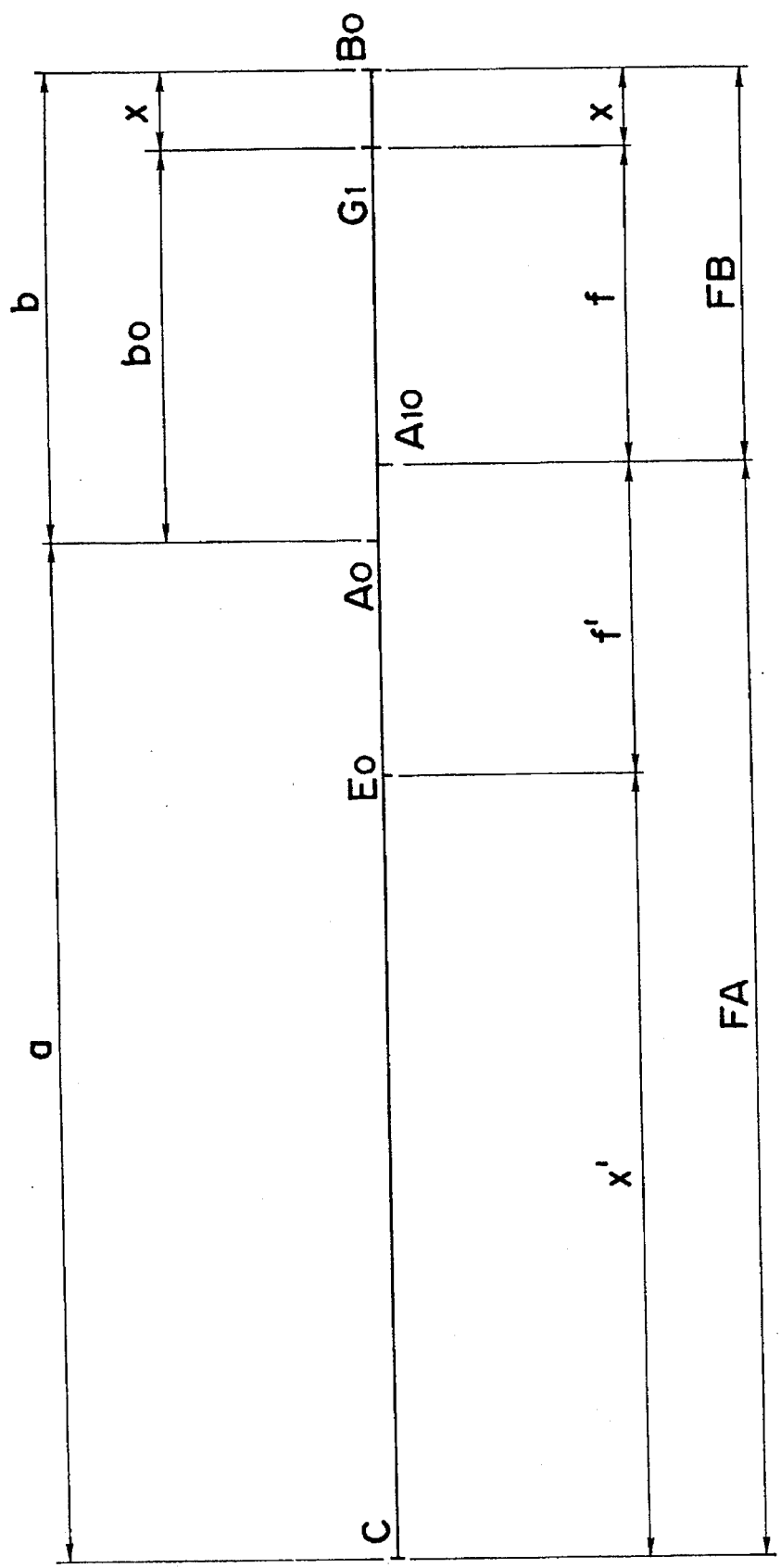
FIG. 6 simply shows an optical system in the first embodiment shown in FIG. 1.

FIG. 6 simply shows the optical system of the photographing apparatus shown in FIG. 1. The thickness of the variable vertical angle prism 2 is small as compared with the focal length f and therefore is not shown. In FIG. 6, f' and x' are the front focal length from the principal point A10 of the photo-taking lens 4 (E0 being the front focus position) and the distance from the front focus position E0 to the object C, respectively, and f'= f. Thus, a and b are calculated from the following equations:

$$b = b0 + x \quad (7)$$

$$x' + f = (f + x) \cdot f/x$$

$$FA = FB \cdot f/x \quad (8)$$

$$\begin{aligned} a &= FA - (b0 - f) \\ &= \{(f + x) \cdot f/x\} - (b0 - f) \end{aligned} \quad (9)$$

The right sides of equations (7) and (9) are only the numerical values already input as information to the camera CPU 13, and both of a and b are calculable. Hereinafter, a and b will be used in the equations in their forms as they are.

Turning back to FIG. 5, at S125, whether the tripod seat M switch 15 is closed is now discriminated, and if the switch 15 is closed, advance is made to S150, and if the switch 15 is not closed, advance is made to S130. At S130, whether the tripod seat L switch 12 is closed is discriminated, and if the switch 12 is closed, advance is made to S140, and if the switch 12 is not closed, advance is made to S135. Subsequently, at S135, whether the eyepiece portion switch 10 is closed is discriminated, and if the switch 10 is closed, advance is made to S140 as at S130, and if the switch 10 is not closed, advance is made to S145.

At S140–S155, a calculation for setting the proper prism vertical angle ($\xi$) of the variable vertical angle prism 2 is effected. Here, description will be made of the relation between the prism vertical angle $\xi$ and the angle of bend $\omega$ of the light flux by the variable vertical angle prism 2.

Figure 7:
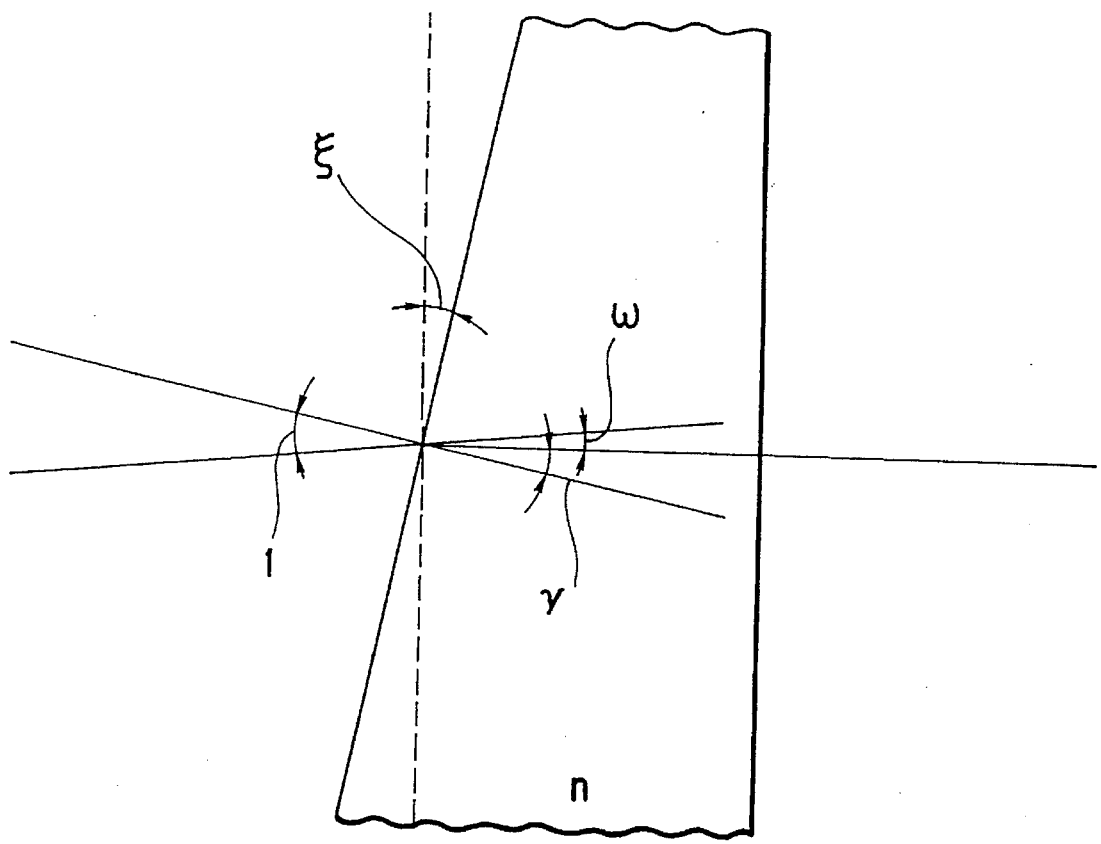
FIG. 7 shows the refraction of an incident light flux in a variable vertical angle prism.

FIG. 7 shows the state of refraction of the incident light flux by the variable vertical angle prism 2. The variable vertical angle prism 2 is such that the entrance surface and exit surface thereof are optical plane glass and the outer peripheral portion thereof is formed by a flexible cylindrical member and the space between the glass of the entrance surface and the glass of the exit surface is filled with liquid of the same refractive index n as that of the glass. The interface between the glass and the liquid is not shown.

The relation between the angle of bend $\omega$ of the light flux by the variable vertical angle prism 2 and the vertical angle $\xi$ of the variable vertical angle prism 2 is expressed by the following equations:

$$\begin{aligned} i &= r + \omega \\ &= \xi + \omega \end{aligned} \quad (10)$$

$$\begin{aligned} i &= n \cdot r \\ &= n \cdot \xi \end{aligned} \quad (11)$$

$$\xi = \omega/(n - 1) \quad (12)$$

Turning back again to FIG. 5, at S140, if the tripod seat L switch 12 or the eyepiece portion switch 10 is closed, that is, if the vicinity of the center of the surface of the film is supported by a support (a tripod or the photographer's face), a camera movement observed can be regarded as the rotation of the optical axis about the center of the surface of the film. Accordingly, the setting of the vertical angle of the variable vertical angle prism 2 for correcting the image movement when the center of rotation of the optical axis is the center B0 of the surface of the film can be effected. The set value of the vertical angle in this case can be found by the use of the aforementioned equations (4), (7), (9) and (12).

$$\xi = \theta \cdot (1 + b/a)/(n-1) \quad (13)$$

At S150, if the tripod seat M switch 15 is closed, that is, if the tripod seat M14 at a distance m from the center of the surface of the film is supported by a support (a tripod), camera movement observed can be regarded as the rotation of the optical axis about a point at the distance m from the center of the surface of the film. Accordingly, the setting of the vertical angle of the variable vertical angle prism 2 for correcting the image movement in the case of the point H0 at the distance m from the center of the surface of the film which has been previously described in connection with FIG. 4 can be effected. The set value of the vertical angle in this case can be found by the use of the aforementioned equations (6), (7), (9) and (12).

$$\xi = \theta \cdot \{1 + (b-m)/a/(n-1)\} \quad (14)$$

At S155, if the entrance portion switch 21 is closed, that is, if the vicinity of the variable vertical angle prism 2 is supported by a support, camera movement observed can be regarded as the rotation of the optical axis about the entrance portion. Accordingly, the setting of the vertical angle of the variable vertical angle prism 2 for correcting the image movement when the center of rotation of the optical axis is the principal point A0 of the photo-taking lens which has been previously described in connection with FIG. 2 can be effected. The set value Of the vertical angle in this case can be found by the use of the aforementioned equations (1), (7), (9) and (12).

$$\xi = \theta/(n-1) \quad (15)$$

The case where advance is made to S145 is a case where none of the aforedescribed four switches is closed, that is, a case where the supported situation of the camera cannot be known and the center of rotation of the optical axis cannot be specified. In such case, if the set value is chosen to a value intermediate of equations (13) and (15), there will be a high possibility that substantially good image movement correction is obtained. The set value of the vertical angle in this case can be found by the use of the following equation:

$$\xi = \theta \cdot \{1 + b/(2-a)\}/(n-1) \quad (16)$$

The camera CPU 13 effects a calculation for setting the proper vertical angle ($\xi$) of the variable vertical angle prism 2, by S140–S155, whereafter it proceeds to S160, where it sends a control output based on the calculated prism vertical angle ($\xi$) to the prism driving unit 3, effects proper prism driving for image movement correction conforming to the situation of image movement, and terminates its operation at S165.

Thus, in the present invention, the supported position of the photographing apparatus can be detected and therefore, the position of the center of rotation of the optical axis can be specified. Accordingly, accurate image movement correction eliminating even the influence of the fluctuation of the angle of incidence of the object light caused by the amount of movement of the entrance portion of the photo-taking lens in a direction perpendicular to the optical axis can be accomplished. This displays a great effect in short distance photographing which is relatively greatly effected by the fluctuation of the angle of incidence of the object light caused by the amount of movement of the entrance portion of the photo-taking lens in a direction perpendicular to the optical axis.

The form in which the present invention is carried out and the sequence of the operation of the device are not restricted to what have been described above. For example, in FIG. 1, there are shown only the longitudinal angular displacement detecting unit and the variable vertical angle prism driving unit, but the present invention is equally applicable with respect to the lateral direction (in FIG. 1, a direction perpendicular to the plane of the drawing sheet). Also, in the first embodiment, description has been made of a case where there are provided tripod seats at two locations, but the supported position can also be suitably specified at only one location or a number of locations.

Also, in the first embodiment, a switch adapted to be closed when bearing against a support is disposed just beneath the variable vertical angle prism 2, but alternatively, such switch may be disposed at a distance m' (which is also memorized in the camera CPU 13) from the photographing film 5 by being fixed to the housing 1. In that case, the following calculation can be effected at S155 of the flow chart shown in FIG. 5:

$$\xi = \theta \cdot \{1+(b-m')/a\}/(n-1) \tag{17}$$

Of course, such switches may be disposed at a plurality of locations.

Also, if advance is made to S145 in the flow chart of FIG. 5 when the photographer adopts a special holding method (for example, when a part of the housing 1 is worked and a holder is attached thereto), the best correction can be accomplished if the calculation expression for $\xi$ at S145 is $$\xi = \theta \cdot \{1+(b-Y)/a\}/(n-1) \tag{18}$$

and the parameter of Y is made freely settable by an input dial, indicated schematically at IO, while being confirmed by means of the finder.

Figure 8:
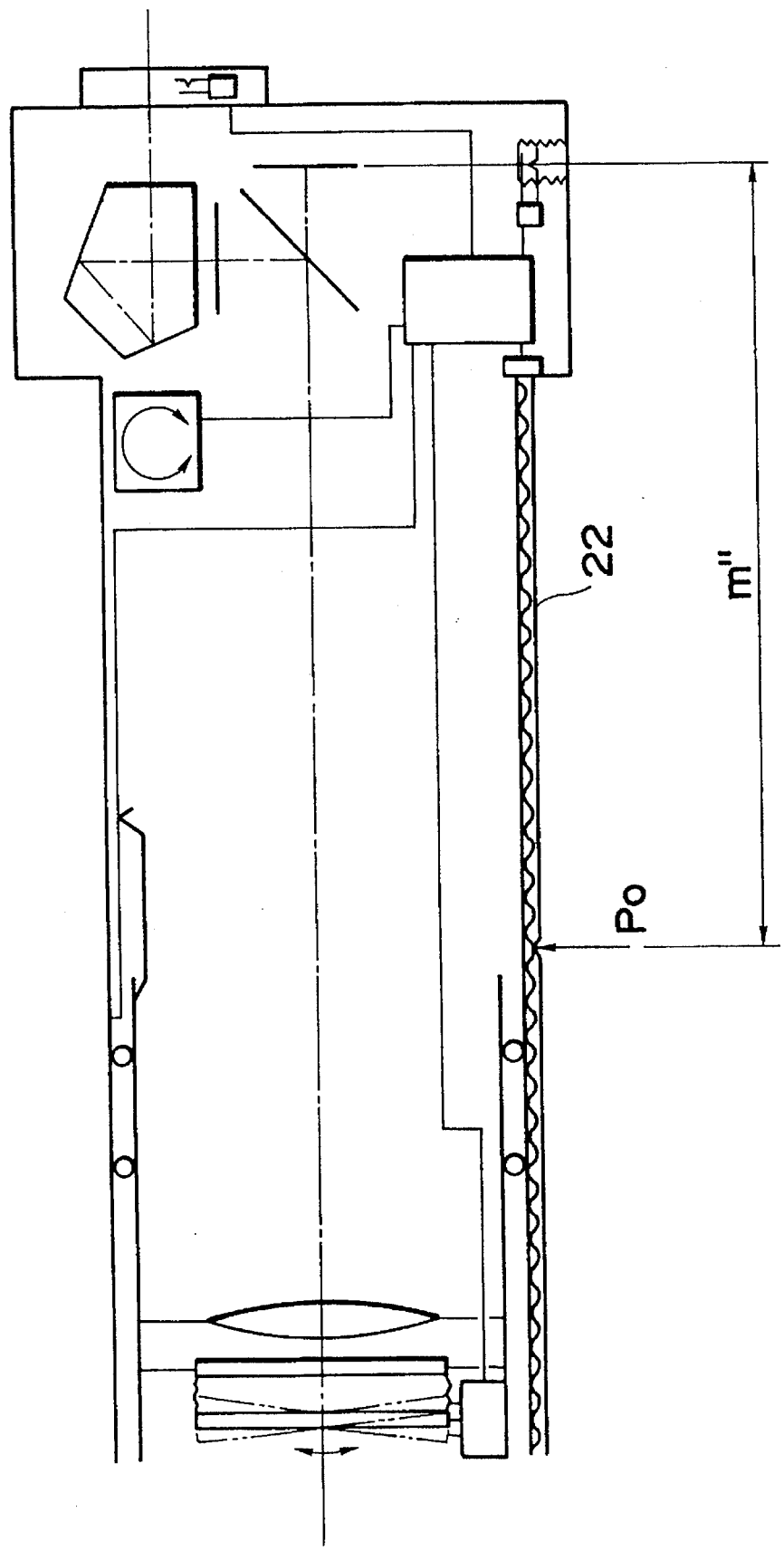
FIG. 8 is a schematic view showing a second embodiment of the image movement correcting device for a photographing apparatus according to the present invention.

FIG. 8 is a schematic view showing a second embodiment of the image movement correcting device for a photographing apparatus according to the present invention. The second embodiment shows an example of the application of a support point detecting switch 22 fixed to the housing 1.

In FIG. 8, the support point detecting switch 22 fixed to the housing 1 is one using a pressure-sensitive sensor comprising a resistor and a flexible electrode. This pressure-sensitive sensor is designed such that when the camera is supported with the housing 1 on a railing, a fence or the like, the electrode in the supported portion is subjected to pressure and is flexed and comes into contact with the resistor, whereby the two conduct. Thus, the support point detecting switch 22 is closed. By the resulting resistance value, the position at which the pressure application (indicated by the support point P0 in FIG. 8) has been exerted can be known to the camera CPU 13.

Figure 9:
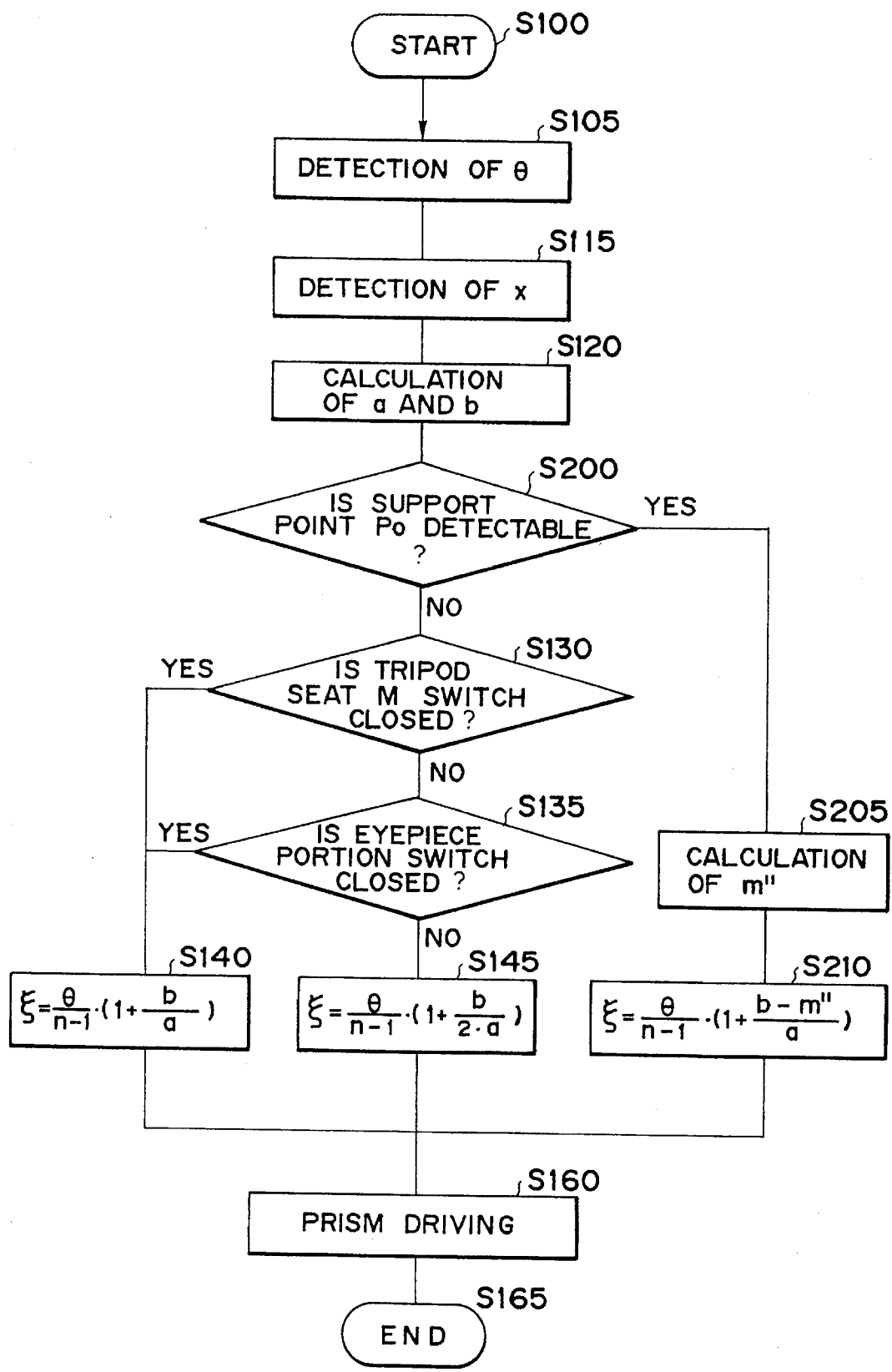
FIG. 9 is a flow chart illustrating the sequence of the operation of the second embodiment shown in FIG. 8.

FIG. 9 is a flow chart illustrating the sequence of the operation of the second embodiment shown in FIG. 8. The same portions as those in FIG. 5 are given the same numbers and need not be described. Start is made from S100, and S110 is omitted and advance is made to S120, where a and b are calculated, whereafter advance is made to S200.

At S200, whether the support point P0 is detectable, that is, at which position the support point detecting switch 22 is closed, is discriminated, and if the support point detecting switch 22 is closed, advance is made to S205, and if the support point detecting switch 22 is not closed, advance is made to S130 and subsequent steps.

At S205, the distance m" between the support point P0 and the photographing film 5 is calculated from the resistance value of the support point detecting switch 22. Subsequently, at S210, the setting of the vertical angle of the variable vertical angle prism 2 for correcting the image movement by the rotation of the optical axis about a point at the distance m" from the center of the surface of the film can be effected.

$$\xi = \theta \cdot \{1+(b-m'')/a\}/(n-1) \tag{19}$$

At S210 or S140 and S145, the proper set value of the vertical angle of the variable vertical angle prism 2 is calculated, whereafter advance is made to S160, and the operation is ended at S165 as in FIG. 5.

In the foregoing, with two embodiments shown as examples, description has been made of the image movement correcting device in which the variable vertical angle prism 2 is disposed as image movement correcting means in the entrance portion of the photo-taking optical system.

Figure 10:
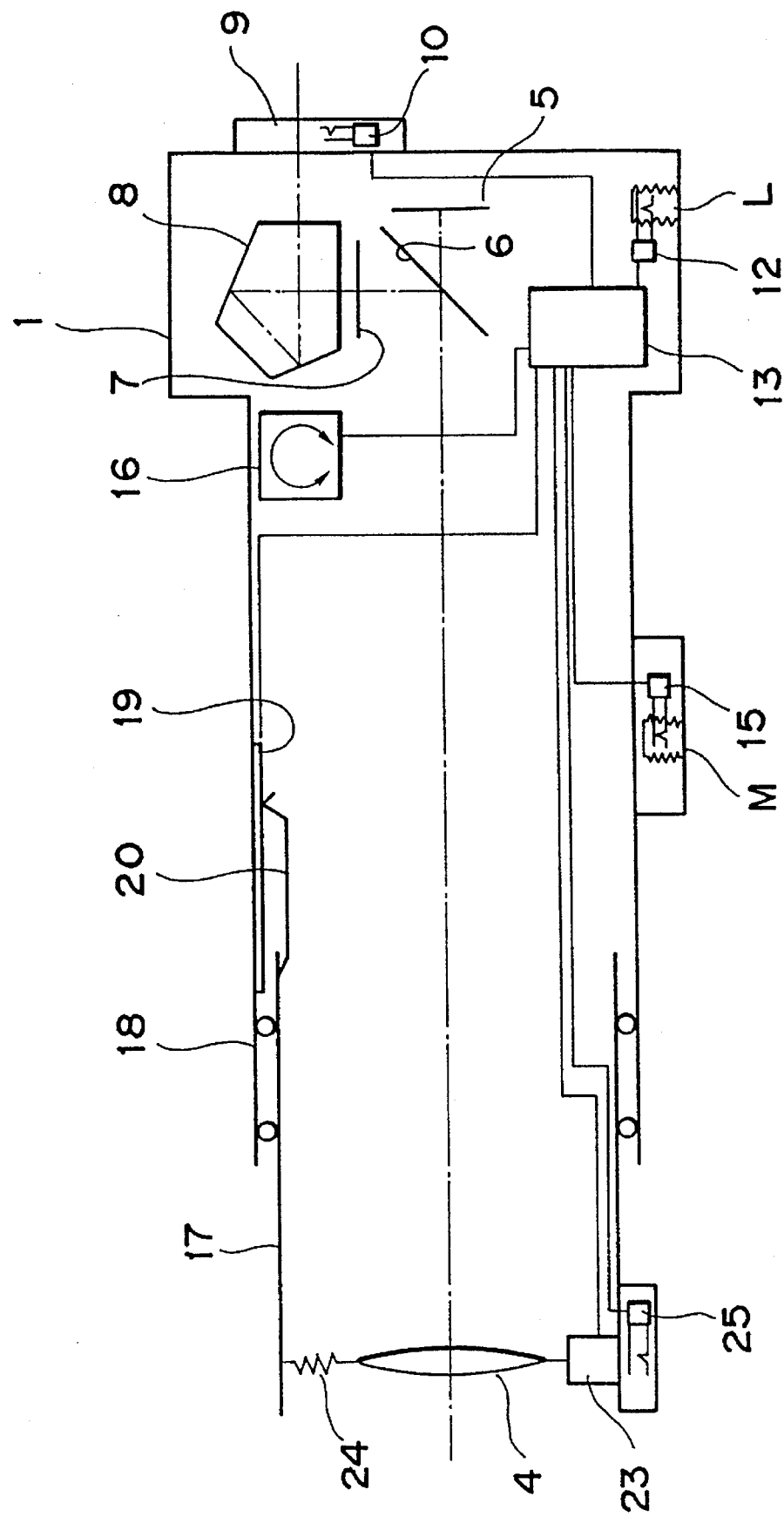
FIG. 10 is a schematic view showing a third embodiment of the image movement correcting device for a photographing apparatus according to the present invention.

Description will now be made of an embodiment in which the image movement correcting means is a shifting device capable of shifting the photo-taking optical system and the image field relative to each other. FIG. 10 is a schematic view showing a third embodiment of the image movement correcting device for a photographing apparatus according to the present invention. The third embodiment is an embodiment in which the image movement correcting means is a shifting device capable of shifting the photo-taking optical system and the image field relative to each other. The same portions as those in FIG. 1 are given the same reference numerals and need not be described.

The photo-taking lens 4 has its weight supported by a spring 24, and a lens shift driving unit 23 can drive the photo-taking lens 4 in a direction perpendicular to the optical axis. A lens portion switch 25 is a switch disposed just beneath the photo-taking lens 4 and adapted to be closed when it bears against a support.

The output of the camera CPU 13 is connected to the lens shift driving unit 23, which shift-drives the photo-taking lens 4 on the basis of the control signal of the camera CPU 13. The output of the lens portion switch 25 is connected to the camera CPU 13, which can detect the closing of the lens portion switch 25.

Here, the amount of image movement D by the rotation of the optical axis about the principal point and the amount of image movement D' by the movement parallel to the principal point (the parallel movement of the principal point and the center of the image field in a direction perpendicular to the optical axis) can be expressed by the following equations when the focal length of the photo-taking lens is f and the lateral magnification of the photo-taking lens is $\beta$ ($\beta=-x/f$) when the amount of axial movement is x) and the angle of rotation of the optical axis is $\theta$ and the amount of parallel movement of the principal point is t (see Japanese Laid-Open Patent Application No. 62-47012):

$$\begin{aligned} D &= \theta \cdot f \cdot (1-\beta) \\ &= \theta \cdot (f+x) \end{aligned} \tag{20}$$

$$\begin{aligned} D' &= t \cdot \beta \\ &= -t \cdot x/f \end{aligned} \tag{21}$$

In a state in which the camera is supported as previously described, it is rarely the case that $\theta$ of equation (20) does not occur but only t of equation (21) occurs independently. However, when the position of the center of rotation of the optical axis is not the principal point of the photo-taking lens 4, the principal point of the photo-taking lens 4 is moved in a direction perpendicular to the optical axis by the rotation of the optical axis and an amount corresponding to t of equation (21) occurs, whereby the image movement amount component D by the parallel movement of the principal point of the photo-taking lens 4 occurs and the true amount of image movement becomes D+D'. This particularly poses a problem when the amount of axial movement x cannot be neglected as compared with the focal length f, that is, during short distance photographing, as is apparent from equations (20) and (21).

On the other hand, as previously described, in a situation in which image movement occurs, some portion of the camera (i.e., the supported region) is scarcely displaced. Accordingly, if the supported situation of the camera can be discriminated, it will be possible to specify the position of the center of rotation of the optical axis (the position free of displacement) and it will become possible to calculate D+D' including the amount of image movement D' by the parallel movement of the principal point of the photo-taking lens 4 caused by the rotation of the optical axis.

Here, several positions of the center of rotation of the optical axis are set and the calculation of said D+D' is effected.

Figure 11:
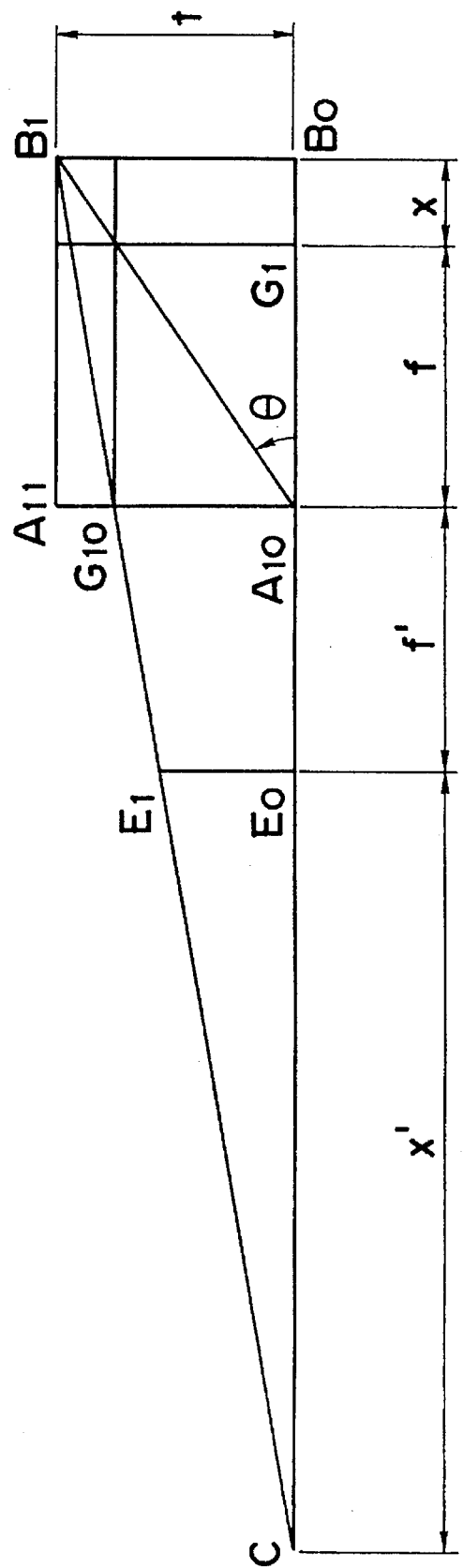
FIG. 11 illustrates the imaged state of an object lying at a finite distance when image movement correcting means is a shift device and the amount of image movement correction when the image moves.
Figure 12:
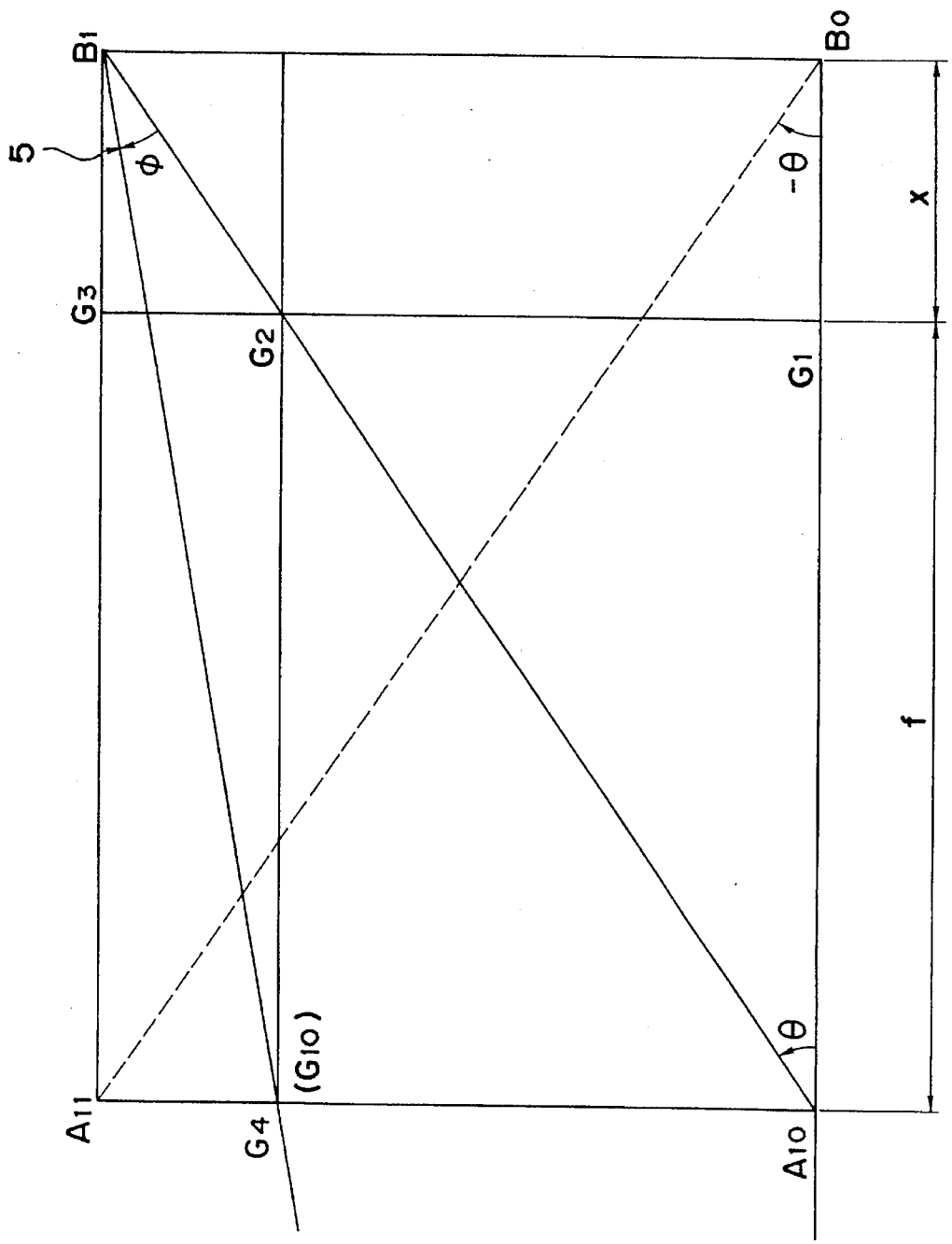
FIG. 12 illustrates the imaged state of an object lying at a finite distance when image movement correcting means is a shift device and the amount of image movement correction when the image moves.

FIG. 11 shows the imaged state of an object lying at a finite distance in an image movement correcting device which detects the hand shaking or the like of a camera to thereby correct a photographed image, and FIG. 12 is an enlarged view of a portion of FIG. 11.

In FIG. 11, a point B0 is the imaged position (the center of the surface of the film), a point A10 is the position of the principal point of the photo-taking lens, points G1 and E0 are the rear and front focus positions of the photo-taking lens, and a point C is the position of the object. The points B0, G1, A10, E0 and C lie on a straight line. What has been described just above is the initial state.

If in FIG. 11, C E0 is x' and E0 A10 is f' and A10 G1 is f and G1 B0 is x (the amount of axial movement of the photo-taking lens), the following Newton imaging expression is obtained:

$$x \cdot x' = f \cdot f' \quad (22)$$

Both of the front and rear of the lens are an equal medium (air) and therefore, f=f' is substituted and:

$$x \cdot x' = f \cdot f \quad (23)$$

Here, an attempt is made to calculate the amount of image movement by the hand shaking of the camera and the amount of shift of the photo-taking lens for correcting the image movement, supposing various conditions.

Description will first be made of the image movement by the rotation about the principal point shown in the aforementioned equation (20). Let it be assumed that the camera has rotated by θ about the principal point (A10) of the photo-taking lens 4 and the center of the surface of the film has moved to a point B1. However, the angle θ is regarded as being slight and is handled as cos θ=1. The amount of image movement relative to the center of the surface of the film (at what coordinates of the image in the initial state the image after having moved is) is given by the following equation as is apparent from FIG. 11:

$$\begin{aligned} DA &= B0\,B1 \\ &= \theta \cdot (f+x) \end{aligned} \quad (24)$$

Equation (24) is equal to equation (20).

Here, add a point A11 at a distance equal to B0 B1 from the point A10, and consider the area of a rectangle A10 B0 B1 A11. To make the object imaged at the center of the surface of the film in a state in which the center of the surface of the film has moved to the point B1, the principal point of the photo-taking lens can be moved to a suitable position on A10 A11 (tentatively a point G10) (see FIG. 11). Thereafter, the position of the point G10 is found.

In FIG. 11, from the relations of B1 G10 E1 C (E1 being the front focus position after the movement of the principal point of the photo-taking lens to the point G10) and A10 A11, the following equation is obtained:

$$B1\,G10/G10C = A11\,G10/G10\,A10 \quad (25)$$

The following equation is also obtained:

$$B1\,G10/G10C = (x+f)/(f+x') \quad (26)$$

The right side of equation (26) will become as follows if equation (22) is modified and substituted for:

$$\begin{aligned} (x+f)/(f+x') &= (x+f)/(f+x') \\ &= (x+f)/\{f+(f^2/x)\} \\ &= \{x \cdot (1+f/x)\}/\{f \cdot (1+f/x)\} \\ &= x/f \end{aligned} \quad (27)$$

Accordingly, from equations (25)–(27), the following equation is obtained:

$$A11\,G10/G10\,A10 = x/f \quad (28)$$

Here, the point G10 is an interior division point which divides the straight line A11 A10 into x:f.

In FIG. 12, the symbols of some points are defined. A line perpendicular to the straight line A10 B0 is drawn from the point G1, and the point of intersection thereof with the straight line A10 B1 is defined as G2, and the point of intersection thereof with A11 B1 is defined as G3. Also, the point of intersection between a line passing through the point G2 and parallel to A10 B0 (also parallel to A11 B1) and the straight line A10 A11 is defined as G4.

From these conditions, the following equation is obtained:

$$\begin{aligned} G3\,G2/G2\,G1 &= B0\,G1/G1\,A10 \\ &= x/f \end{aligned} \quad (29)$$

Also, with respect to G4, the following equation is obtained:

$$\begin{aligned} A11\,G4/G4\,A10 &= G3\,G2/G2\,G1 \\ &= x/f \end{aligned} \quad (30)$$

From equations (28) and (30), it is seen that G10=G4. This position will hereinafter be expressed as G4.

Next, an amount (A10 G4) by which the principal point of the photo-taking lens is moved is found.

$$A10\,A11 = B0\,B1 = \theta \cdot (f+x) \quad (31)$$

$$\begin{aligned} A10\,G4 &= A10\,A11 \cdot f/(f+x) \\ &= \theta \cdot (f+x) \cdot f/(f+x) \\ &= \theta \cdot f \end{aligned} \quad (32)$$

The correction angle $\phi$ (LA10 B1 G4) is as follows:

$$\zeta\ (\angle A11B1\ G4) = \theta \cdot x/(f+x) \tag{33}$$

$$\begin{aligned}\phi &= \zeta - \theta \\ &= \theta \cdot \{x/(f+x) - 1\} \\ &= \theta \cdot \{-f/(f+x)\}\end{aligned} \tag{34}$$

Next, the image movement by the principal point of the photo-taking lens being shifted from the point A10 to the point G4 is calculated. The amount of image movement by the rotation about the principal point is defined as dA, and the amount of image movement by the parallel movement of the principal point is defined as d'A, and these are substituted for equations (20) and (21).

$$\begin{aligned}dA &= \phi \cdot (f+x) \\ &= \theta \cdot (f+x) \cdot \{-f/(f+x)\} \\ &= -\theta \cdot f\end{aligned} \tag{35}$$

$$\begin{aligned}d'A &= \theta \cdot f \cdot (-x/f) \\ &= -\theta \cdot x\end{aligned} \tag{36}$$

$$dA + d'A = -\theta \cdot (f+x) \tag{37}$$

If equation (37) is added to equation (24), the result is the amount of image movement after correction.

$$DA + (dA + d'A) = 0 \tag{38}$$

From the above equation, it can be seen that the image movement can be eliminated. As described above, when the camera has rotated by $\theta$ about the principal point (A10) of the photo-taking lens, if the photo-taking lens is shifted by $\theta.f$ as can be expressed by equation (32), the image movement can be eliminated.

Next, consider a case where the camera has rotated by $-\theta$ about the imaged position (the center of the surface of the film) B0 and the principal point of the photo-taking lens has moved to A11. The amount of image movement of the center of the surface of the film (at what coordinates of the image in the initial state the image after movement is) can be found from the following equations:

$$DB = (-\theta).(f+x) \tag{39}$$

$$D'B = \theta.(f+x).(-x/f) \tag{40}$$

The position to which the principal point of the photo-taking lens should be moved to image the object at the center of the surface of the film is the point A10 because it is apparent that the image can be restored to the initial state. Accordingly, the amount of movement is given by the following equation:

$$A11A10 = (-\theta).(f+x) \tag{41}$$

The amount of image movement by the rotation about the principal point and the amount of image movement by the parallel movement of the principal point are found as follows:

$$dB = \theta.(f+x) \tag{42}$$

$$d'B = (-\theta).(f+x).(-x/f) \tag{43}$$

$$DB + D'B + dB + d'B = 0 \tag{44}$$

Accordingly, it is seen that image movement taking not only DB but also D'B into account can be eliminated. As described above, when the camera has rotated by $-\theta$ about the center of the surface of the film, if the photo-taking lens is shifted by $(-\theta).(f+x)$ as can be expressed by equation (41), image movement can be eliminated.

Figure 13:
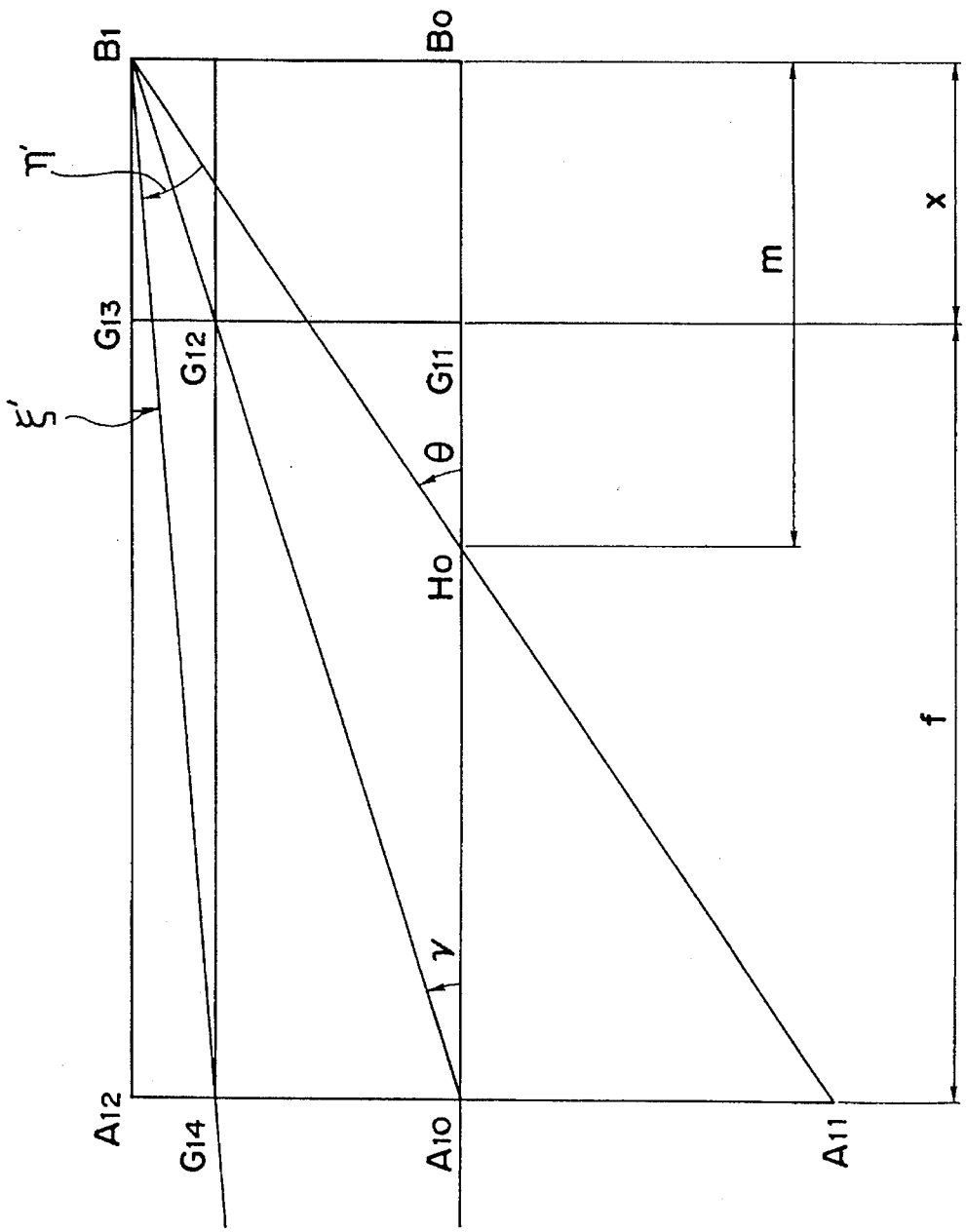
FIG. 13 illustrates the imaged state of an object lying at a finite distance when image movement correcting means is a shift device and the amount of image movement correction when the image moves.

Next, consider a case where the camera has rotated by $\theta$ to a point H0 at a distance m from the center B0 of the surface of the film and the principal point of the photo-taking lens 4 (the initial position A10) has moved to the point A11. FIG. 13, in a manner similar to FIG. 12, shows the above-described imaged state.

In this case, the center of the surface of the film moves from the point B0 to a point B1. The amount of image movement of the center of the surface of the film (at what coordinates of the image in the initial state the image after movement is) is given by the following equations:

$$DC = \theta \cdot (f+x) \tag{45}$$

$$\begin{aligned}D'C &= A10A11 \cdot (-x/f) \\ &= -\theta \cdot (f+x-m) \cdot (-x/f) \\ &= \theta \cdot x \cdot (f+x-m)/f\end{aligned} \tag{46}$$

When here, A12 at a distance equal to B0 B1 from A10 is added and the area of a rectangle A10 B0 B1 A12 is considered, this rectangle is analogous to the rectangle A10 B0 B1 A11 of FIG. 12. If G11, G12 and G13 of FIG. 13 are taken in a positional relation similar to that of G1, G2 and G3 of FIG. 12, the position G14 to which the principal point of the photo-taking lens should be moved is the position given by the following equation. It is to be understood that v=LB0 A10 B1.

$$\begin{aligned}A10G14 &= A10A12 \cdot f/(f+x) \\ &= v \cdot (f+x) \cdot f/(f+x) \\ &= v \cdot f\end{aligned} \tag{47}$$

When attention is paid to the side B0 B1, $$\begin{aligned}B0\ B1 &= \theta \cdot m \\ &= v \cdot (f+x) \\ v &= \theta \cdot m/(f+x)\end{aligned} \tag{48}$$

From equation (48), equation (47) can be rewritten as follows:

$$A10G14 = \theta.m.f/(f+x) \tag{49}$$

A11 A10 can be found from LA10 H0 A11=$\theta$ by the following equation:

$$A11A10 = \theta.(f+x-m) \tag{50}$$

The distance A11 G14 by which the principal point of the photo-taking lens 4 should be moved is given by the following equation:

$$\begin{aligned}A11G14 &= A11A10 + A10G14 \\ &= \theta \cdot (f+x-m) + \theta \cdot m \cdot f/(f+x) \\ &= \theta \cdot \{f+x-m+m \cdot f/(f+x)\} \\ &= \theta \cdot [f+x\{1-m/(f+x)\}]\end{aligned} \tag{51}$$

The verification of the elimination of image movement will be done below. The amount of image movement dC by the rotation about the principal point and the amount of image movement d'C by the parallel movement of the principal point are found.

$$dC = (f+x) \cdot \eta' \quad (52)$$
$$= (f+x) \cdot G14A11/(f+x)$$
$$= G14A11$$
$$= -\theta \cdot [f + x\{1 - m/(f+x)\}]$$

$$d'C = A11G14 \cdot (-x/f) \quad (53)$$
$$= \theta \cdot \{f + x - m \cdot x/(f+x)\} \cdot (-x/f)$$

If equations (45), (46), (52) and (53) are added together.

$$DC + D'C + dC + d'C = -\theta \cdot m \cdot x/f + \quad (54)$$
$$\theta \cdot m \cdot x/(f+x) +$$
$$\theta \cdot m2 \cdot x/\{(f+x) \cdot f\}$$
$$= \{-\theta \cdot m \cdot x \cdot (f+x) +$$
$$\theta \cdot m \cdot x \cdot f +$$
$$\theta \cdot m2 \cdot x\}/\{(f+x) \cdot f\}$$
$$= 0.$$

Accordingly, it is seen that the image movement DC+D'C can be eliminated. As described above, when the camera has rotated by θ about the point H0 at a distance m from the center B0 of the surface of the film, if the photo-taking lens is shifted by θ.[f+x{1−m/(f+x)}] as shown in equation (51), image movement can be eliminated.

If m=0 is substituted for equation (51), this equation will become equivalent to equation (41) (it is equivalent although −θ is adopted because the direction of rotation is reverse), and if m=f+x is substituted for equation (51), this equation will become equivalent to equation (32).

Figure 14:
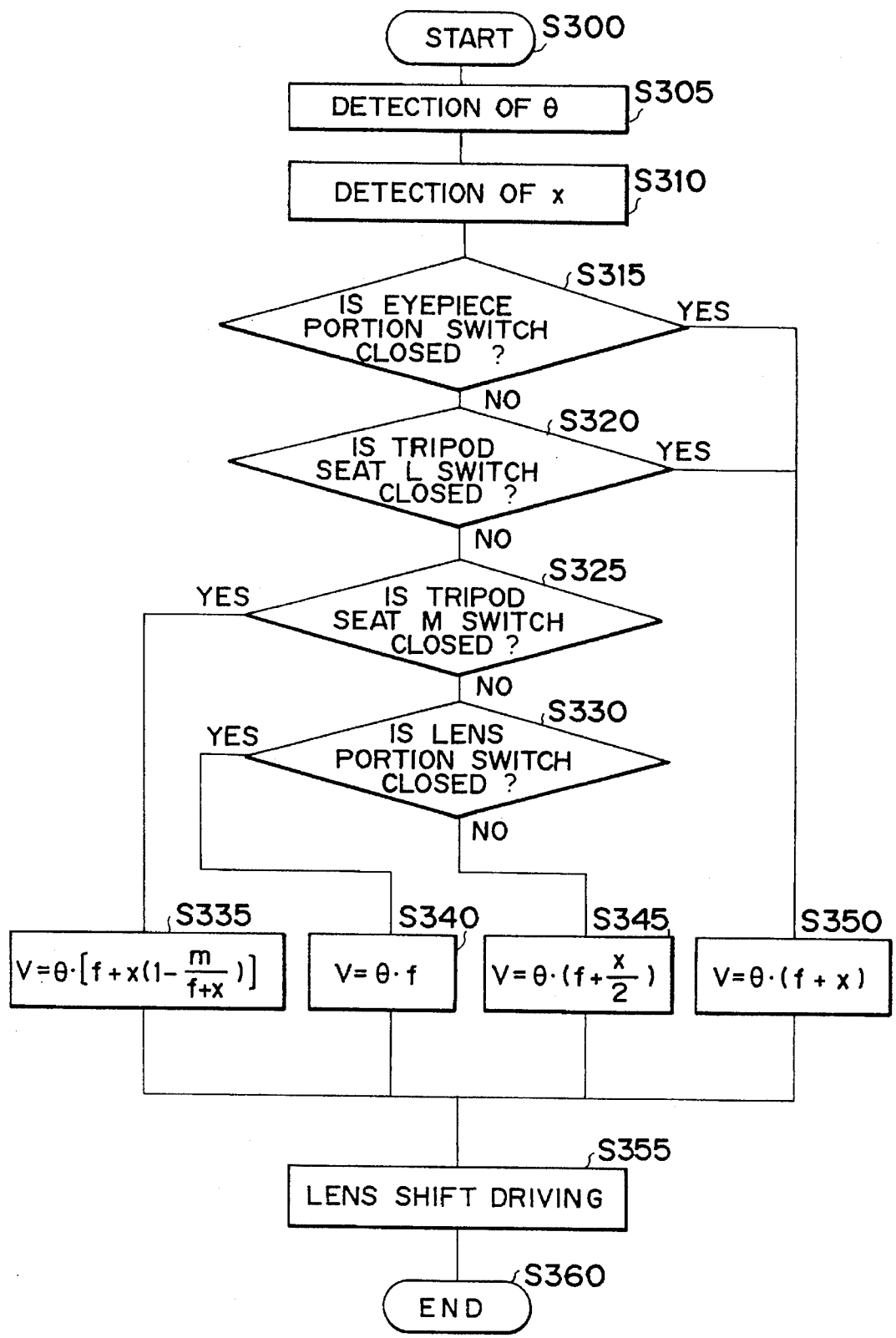
FIG. 14 is a flow chart illustrating the sequence of the operation of the third embodiment shown in FIG. 10.

FIG. 14 is a flow chart illustrating the sequence of the operation of a third embodiment of the image movement correcting device for a photographing apparatus according to the present invention. Unless otherwise specified, it is to be understood that the operation is processed by the camera CPU 13.

Start is made from S300, and at S305, an angular displacement output θ is input from the angular displacement detecting unit 16. Subsequently, at S310, a photo-taking lens axial movement amount output x is input from the linear encoder 19.

Subsequently, at S315, whether the eyepiece portion switch 10 is closed is discriminated, and if the switch 10 is closed, advance is made to S350, and if the switch 10 is not closed, advance is made to S320. At S320, whether the tripod seat L switch 12 is closed is discriminated, and if the switch 12 is closed, advance is made to S350, and if the switch 12 is not closed, advance is made to S325. At S325, whether the tripod seat M switch 15 is closed is discriminated, and if the switch 15 is closed, advance is made to S335, and if the switch 15 is not closed, advance is made to S330. At S330, whether the lens portion switch 25 is closed is discriminated, and if the switch 25 is closed, advance is made to S340, and if the switch 25 is not closed, advance is made to S345. At S335–S350, the proper amount of shift (V) of the photo-taking lens is calculated.

S335 is a case where the tripod seat M switch 15 is closed, that is, a case where the tripod seat M at a distance m from the center of the surface of the film is supported by a support (a tripod), and the camera shaking observed can be regarded as the rotation of the optical axis about a point at the distance m from the center of the surface of the film. Accordingly, the calculation of the amount of image movement regarding the camera shaking and the calculation of the amount of shift of the photo-taking lens for correction in the case of the point H0 at the distance m from the aforementioned imaged position can be applied. Specifically, the aforementioned equation (51) can be applied.

$$V = \theta \cdot [f + x\{1 - m/(f+x)\}] \quad (55)$$

S340 is a case where the lens portion switch 25 is closed, that is, a case where the vicinity of the photo-taking lens 4 is supported by a support, and the camera shaking observed can be regarded as the rotation of the optical axis about the principal point of the photo-taking lens 4. Accordingly, the calculation of the amount of image movement regarding the camera shaking and the calculation of the amount of shift of the photo-taking lens for correction when the aforedescribed center of rotation of the optical axis is the principal point A10 of the photo-taking lens 4 can be applied. Specifically, the aforementioned equation (32) can be applied.

$$V = \theta \cdot f \quad (56)$$

S350 is a case where the eyepiece portion switch 10 or the tripod seat L switch 12 is closed, that is, a case where the vicinity of the center of the surface of the film is supported by a support (a tripod or the photographer's face), and the camera shaking observed can be regarded as the rotation of the optical axis about the center of the surface of the film. Accordingly, the calculation of the amount of image movement regarding the camera shaking and the calculation of the amount of shift of the photo-taking lens for correction when the aforedescribed center of rotation of the optical axis is the center B0 of the surface of the film can be applied. Specifically, the aforementioned equation (41) can be applied.

$$V = \theta \cdot (f+x) \quad (57)$$

The case where advance is made to S345 is a case where none of the aforementioned four switches is closed, that is, a case where the supported situation of the camera cannot be known and the center of rotation of the optical axis cannot be specified. In such case, if the set value is chosen to a value intermediate of equations (56) and (57), there will be a high possibility that substantially good image movement correction is obtained. Accordingly, the following equation is applied:

$$V = \theta \cdot (f + x/2) \quad (58)$$

The camera CPU 13 effects the calculation of the proper amount of shift (V) of the photo-taking lens 4 at S335–S350, sends a control output based on the calculated amount of shift (V) of the photo-taking lens to the lens shift driving unit 23, effects the proper shift driving of the photo-taking lens for image movement correction conforming to the situation of image movement, and terminates its operation at S360.

Again in the third embodiment, the form in which the present invention is carried out and the sequence of the operation of the device are not restricted to what have been described above, as in the case of the first and second embodiments in which the variable vertical angle prism is disposed as the image movement correcting means in the entrance portion of the photo-taking optical system. For example, if in the flow chart of FIG. 14, advance is made to S345 when the photographer adopts a special holding method (for example, when a part of the housing 1 is worked and a holder is attached thereto), the best correction can be accomplished if the calculation expression for V at S345 is $$V = \theta \cdot (f + Y') \quad (59)$$

and the parameter of Y' is made freely settable by an input dial, not shown, while being confirmed by means of the finder.

Figure 15:
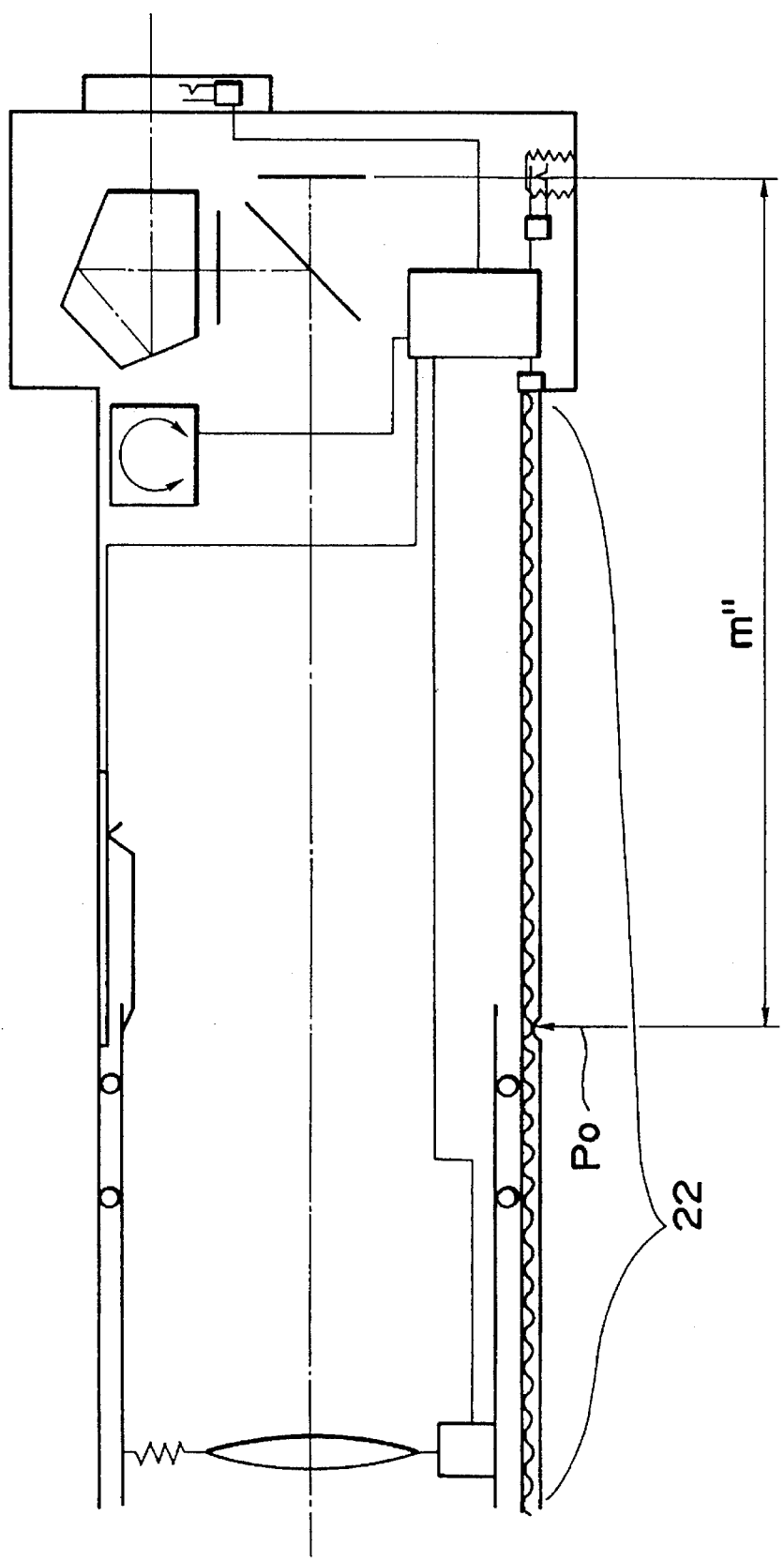
FIG. 15 is a schematic view showing a fourth embodiment of the image movement correcting device for a photographing apparatus according to the present invention.
Figure 16:
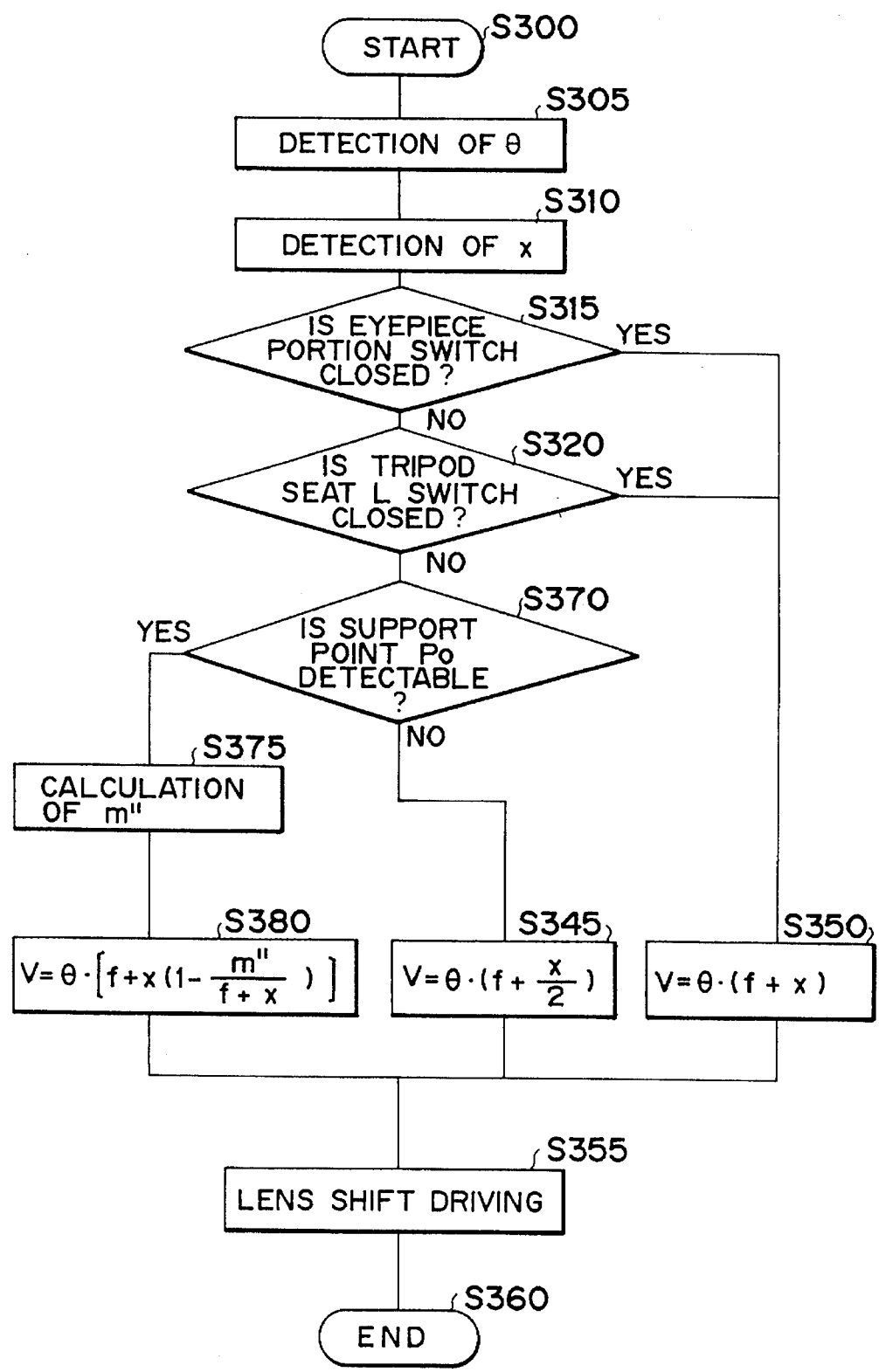
FIG. 16 is a flow chart illustrating the sequence of the operation of the fourth embodiment shown in FIG. 15.

FIG. 15 is a schematic view showing a fourth embodiment of the image movement correcting device for a photographing apparatus according to the present invention, and FIG. 16 is a flow chart illustrating the sequence of the operation of the fourth embodiment shown in FIG. 15. The fourth embodiment uses a support point detecting switch 22 for the pressure-sensitive sensor comprising a resistor and a flexible electrode which has been described with reference to FIG. 8. The same portions as those in the aforedescribed embodiments are given the same reference numerals and need not be described.

At S320, whether the tripod seat L switch 12 is closed is discriminated, whereafter advance is made to S370, where whether the support point P0 is detectable, that is, whether the position at which the support point detecting switch 22 is closed is discriminated. If the support point detecting switch 22 is closed, advance is made to S375, and if the support point detecting switch 22 is not closed, advance is made to S345.

At S375, the distance m" between the support point P0 and the photographing film 5 is calculated from the resistance value of the support point detecting switch 22. Subsequently, at S380, the calculation of the amount of image movement by the rotation of the optical axis about a point at the distance m" from the center of the surface of the film and the calculation of the amount of shift of the photo-taking lens for correction are effected.

$$V=\theta.[f+x\{1-m''/(f+x)\}] \quad (60)$$

At S380 or S345 and S350, the proper amount of shift of the photo-taking lens is calculated, whereafter advance is made to S355, and the operation is ended at S360 as in FIG. 15.

Figure 18:
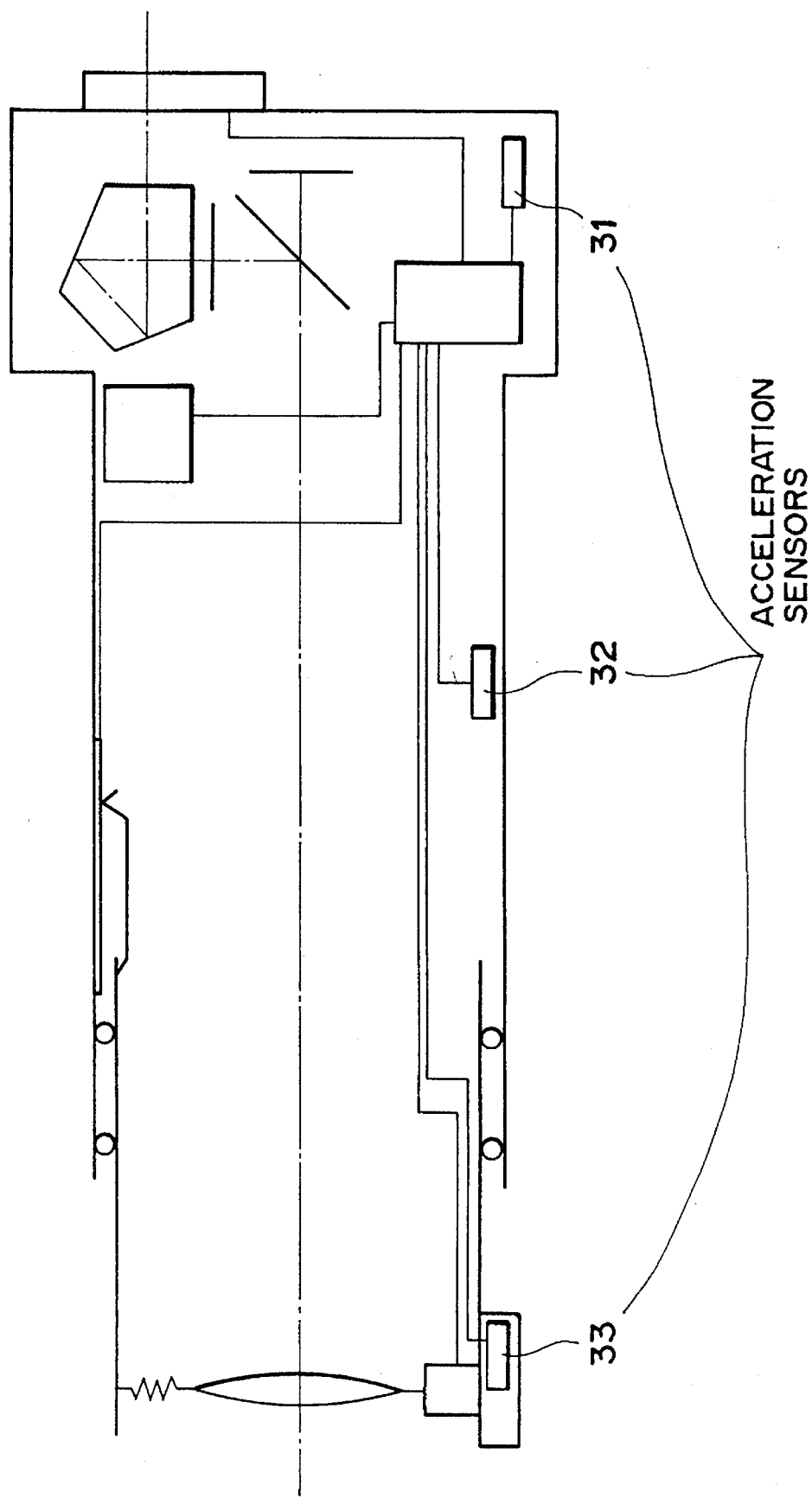
FIG. 18 is a schematic view showing a fifth embodiment of the image movement correcting device for a photographing apparatus according to the present invention.

The means for discriminating the position of the center of rotation typified by the support point detecting means of the device of the present invention is not restricted to what has been described above, but for example, instead of the tripod seat switches 12 and 15 and the lens portion switch 25 in FIG. 14, acceleration sensors or pivotal movement sensors may be disposed as shown in FIG. 18 and the position of the sensor whose output fluctuation during a unit time is smallest may be regarded the center of rotation.

The acceleration sensors or the pivotal movement sensors are used to compare the magnitudes of the amounts of pivotal movement of various portions during a unit time and therefore, need not be sensors of high quality which are good in the zero point drift characteristic during a long time and the linearity of the amount of antivibration, but may be inexpensive ones. Therefore, even if they overlap with the angular displacement detecting unit, there will arise no problem in cost.

For acceleration sensors or pivotal movement sensors to be used in the device of the present invention, as in the case of the switches shown in FIG. 14, the mounted positions of the acceleration sensors or the pivotal movement sensors can be memorized in advance in the camera CPU 13, and such sensors can be easily adapted for the purpose.

Also, for the description of a shifting device capable of shifting the photo-taking optical system and the image field relative to each other, there has been shown an example in which the photo-taking lens is a thin single lens and the whole of this photo-taking lens is shifted to thereby effect image movement correction, but of course, this is not restrictive. It is apparent that the device of the present invention is applicable also as an image movement correcting device which drive-controls a photo-taking lens which is comprised of a number of lens units and in which some of the lens units are shifted for image movement correction (for example, applicant's Japanese Laid-Open Patent Application No. 2-234115).

What is claimed is:

1. An image movement correcting device for a photographing apparatus, comprising:

angular displacement detecting means for detecting an angular fluctuation of an optical axis of the photographing apparatus;

image movement correcting means for effecting image movement correction on a photographing image field;

photograph distance detecting means for detecting a photographing distance to an object to be photographed;

rotation center position discriminating means for discriminating a position of a center of rotation of the detected angular fluctuation; and image movement correction control means for controlling an amount of image movement correction by said image movement correcting means based on the angular fluctuation detected by said angular displacement detecting means, the photographing distance detected by said photographing distance detecting means, and the position of the center of rotation discriminated by said rotation center position discriminating means.

2. An image movement correcting device according to claim 1, characterized in that said rotation center position discriminating means includes means for discriminating a supported region of said photographing apparatus.

3. An image movement correcting device according to claim 1, characterized in that said rotation center position discriminating means includes a support point detecting switch with an electrical contact adapted to be closed by pressing.

4. An image movement correcting device according to claim 3, characterized in that said support point detecting switch is disposed in an eyepiece portion.

5. An image movement correcting device according to claim 3, characterized in that said image movement correcting means includes a variable vertical angle prism device disposed in an entrance portion of a photo-taking optical system, and said support point detecting switch is disposed near said variable vertical angle prism device.

6. An image movement correcting device according to claim 1, characterized in that said rotation center position discriminating means includes a mounting detecting switch disposed on a tripod mounting portion of said photographing apparatus for detecting that a tripod has been mounted on said photographing apparatus.

7. An image movement correcting device according to claim 1, characterized in that said rotation center position discriminating means includes a pressure-sensitive sensor disposed on an outer surface of said housing of said photographing apparatus and capable of specifying a position of a pressing point.

8. An image movement correcting device according to claim 1, characterized in that said rotation center position discriminating means is at least two acceleration sensors disposed in said photographing apparatus.

9. An image movement correcting device according to claim 1, characterized in that when the discrimination of the position of the center of rotation of the angular fluctuation by said rotation center position discriminating means is impossible during the photographing by said photographing apparatus, said image movement correction control means adjusts the amount of image movement correction by said image movement correcting means based on a value for a predetermined position of the center of rotation.

10. An image movement correcting device according to claim 1, characterized in that said image movement correcting means includes a variable vertical angle prism device disposed in an entrance portion of a photo-taking optical system.

11. An image movement correcting device according to claim 1, characterized in that said image movement correcting means includes a shifting device capable of shifting a photo-taking optical system and said image field relative to each other.

12. An image movement correcting device for a photographing apparatus having angular displacement detecting means for detecting an angular fluctuation of an optical axis of the photographing apparatus, image movement correcting means for effecting image movement correction on a photographing image field, and image movement correction control means for controlling an amount of image movement correction by said image movement correcting means based on the angular fluctuation detected by said angular displacement detecting means, and further comprising:

rotation center position discriminating means for discriminating a position of a center of rotating movement causing the angular fluctuation of the optical axis;

said image movement correction control means controlling an amount of image movement correction by said image movement correcting means in accordance with the position discriminated by said rotation center position discriminating means.

13. An image movement correcting device for a photographing apparatus, comprising:

angular displacement detecting means for detecting an angular fluctuation of an optical axis of the photographing apparatus;

image movement correcting means for effecting image movement correction on a photographing image field;

photographing distance detecting means for detecting a photographing distance to an object to be photographed;

means for providing a value regarding a changeable position of a center of rotation of angular fluctuation of the optical axis of said photographing apparatus; and image movement correction control means for controlling an amount of image movement correction by said image movement correcting means based on the angular fluctuation detected by said angular displacement detecting means, the photographing distance detected by said photographing distance detecting means, and said value regarding the position of the center of rotation.

14. An image movement correcting device according to claim 13, including supported region discriminating means for discriminating a supported region of said photographing apparatus, and wherein said value providing means determines said value regarding the position of the center of rotation based on a discrimination signal from said supported region discriminating means.

15. An image movement correcting device according to claim 14, characterized in that said supported region discriminating means includes a support point detecting switch with an electrical contact adapted to be closed by pressing.

16. An movement correcting device according to claim 15, characterized in that said support point detecting switch is disposed in an eyepiece portion.

17. An image movement correcting device according to claim 14, characterized in that said supported region discriminating means includes a mounting detecting switch disposed on a tripod mounting portion of said photographing apparatus for detecting that a tripod has been mounted on said photographing apparatus.

18. An image movement correcting device according to claim 14, characterized in that said supported region discriminating means includes a pressure-sensitive sensor disposed on an outer surface of the housing of said photographing apparatus and capable of specifying a position of a pressing point.

19. An image movement correcting device according to claim 14, characterized in that said supported region discriminating means includes at least two acceleration sensors disposed in said photographing apparatus.

20. An image movement correcting device according to claim 13, characterized in that said value regarding the position of the center of rotation is pre-memorized as a predetermined value in said movement correction control means.

21. An image movement correcting device according to claim 14, characterized in that when discrimination of a supported region of said photographing apparatus by said supported region discriminating means is impossible, said value regarding the position of the center of rotation is a value corresponding to a predetermined position of the center of rotation.

22. An image movement correcting device according to claim 13, including an operating member for making said value regarding the position of the center of rotation adjustable by a photographer's operation.

23. An image movement correcting device for a photographing apparatus, comprising angular displacement detecting means for detecting an angular fluctuation of an optical axis of the photographing apparatus, image movement correcting means for effecting image movement correction on a photographing image field, image movement correction control means for controlling an amount of image movement correction by said image movement correcting means based on the angular fluctuation detected by said angular displacement detecting means, and supported region discriminating means for discriminating a supported region of said photographing apparatus, wherein in accordance with a result of the discrimination of said supported region, said image movement correction control means adjusts an amount of control for controlling an amount of image movement correction by said image movement correcting means.

24. An image movement correcting device according to claim 23, characterized in that when said supported region discriminating means cannot discriminate supported region of said photographing apparatus, said image movement correction control means controls the amount of image movement correction by said image movement correcting means by an amount of control corresponding to a predetermined supported region.

25. In an image movement correcting device for a photographing apparatus for detecting an angular fluctuation of an optical axis of the photographing apparatus, and correcting image movement on a photographing image field attributable to the angular fluctuation of said optical axis, a driving method for said correcting device, comprising:

varying a driving amount for correcting the image movement according to a changeable positional relation of a center of rotation of angular fluctuation of the optical axis of said photographing apparatus with respect to the direction of the optical axis of said photographing apparatus.

26. In an image movement correcting device for a photographing apparatus for detecting an angular fluctuation of an optical axis of the photographing apparatus, and correcting image movement on a photographing image field attributable to the angular fluctuation of said optical axis, a driving method for the correcting device, comprising:

varying a driving amount for correcting the image movement according to a function of values corresponding to a changeable positional relation of a center of rotation of angular fluctuation of the optical axis of said photographing apparatus with respect to the direction of the optical axis of said photographing apparatus and to a photographing distance to an object to be photographed.

27. An image movement correcting device for a photographing apparatus, comprising:

angular displacement detecting means for detecting an angular fluctuation of a housing of the photographing apparatus and producing a corresponding output;

a photo-taking lens;

image movement correcting means for performing an image movement correction of an image projected onto a predetermined position in the housing through said photo-taking lens;

image movement correction controlling means for controlling said image movement correcting means based on the output from said angular displacement detecting means;

lens position detecting means for detecting a position of said photo-taking lens in an optical axis direction and producing a corresponding output; and rotation center position outputting means for producing an output corresponding to a position, along a predetermined axial direction of said housing, of a rotation center position of a rotation movement causing the angular fluctuation of said housing;

said image movement correction controlling means changing an amount of correction based on the output from said angular displacement detecting means in accordance with the outputs from said rotation center position outputting means and said lens position detecting means.

28. An image movement correcting device according to claim 27, characterized in that said rotation center position outputting means detects a supported region of the housing and changes output depending thereon.

29. An image movement correcting device according to claim 27, characterized in that said rotation center position outputting means includes a support point detecting switch with an electrical contact that is closed by pressing.

30. An image movement correcting device according to claim 29, characterized in that said support point detecting switch is disposed in an eyepiece portion.

31. An image movement correcting device according to claim 27, characterized in that said rotation center position outputting means includes a mounting detecting switch disposed on a tripod mounting portion of said photographing apparatus and detecting whether a tripod has been mounted on said photographing apparatus.

32. An image movement correcting device according to claim 27, characterized in that said rotation center position outputting means includes a pressure-sensitive sensor disposed on an outer surface of the housing of said photographing apparatus and capable of specifying a position of a pressing point.

33. An image movement correcting device according to claim 27, characterized in that said rotation center position outputting means includes at least two acceleration sensors disposed in said photographing apparatus.

34. An image movement correcting device for a photographing apparatus, comprising:

angular displacement detecting means for detecting an angular fluctuation of a housing of the photographing apparatus and producing a corresponding output;

a photo-taking lens;

image movement correcting means for performing an image movement correction of an image projected onto a predetermined position in the housing through said photo-taking lens;

image movement correction controlling means for controlling an amount of image movement correction by said image movement correcting means based on the output from said angular displacement detecting means;

lens position detecting means for detecting a position of said photo-taking lens in an optical axis direction and producing a corresponding output;

rotation center position outputting means for producing an output corresponding to a position, along a predetermined axial direction of said housing, of a rotation center position of rotation movement causing the angular fluctuation of said housing; and modifying output generating means for generating a prescribed modifying output dependent upon the output from said lens position detecting means;

said image movement correction control means changing a correction amount based on the output from said angular displacement detecting means in accordance with said modifying output, when said rotation center position outputting means cannot generate an output.

35. An image movement correcting device according to claim 34, including adjustable means for adjusting said modifying output.

36. An image movement correcting device according to claim 34, wherein said modifying output based on a predetermined value.

37. An image movement correcting device of a photographing apparatus, comprising:

an angular displacement detector for detecting an angular fluctuation of a housing of the photographing apparatus and producing a corresponding output;

a photo-taking lens;

an image movement correcting section for correcting movement of an image formed through said photo-taking lens;

a lens position detecting section for detecting a position of said photo-taking lens in an optical axis direction and producing a corresponding output;

a calculation section for calculating image movement correction amounts corresponding to a predetermined direction of corrective movement, according to a plurality of different functions based on the output of said angular displacement detector and including at least one function based additionally on the output of said lens position detecting section;

rotation center position outputting means for detecting a supported region of the housing and for changing output depending thereon; and a selecting section which selects among said functions based on the output of said rotation center position outputting means;

said image movement correcting section effecting image movement correction in accordance with the correction amount calculated according to the selected function.

38. An image movement correcting device of a photographing apparatus, comprising:

an angular displacement detector for detecting an angular fluctuation of a housing of the photographing apparatus and producing a corresponding output;

a photo-taking lens;

an image movement correcting section for correcting movement of an image formed through said photo-taking lens;

a lens position detecting section for detecting a position of said photo-taking lens in an optical axis direction and producing a corresponding output;

a calculation section for calculating image movement correction amounts corresponding to a predetermined direction of corrective movement, according to a plurality of different functions based on the output of said angular displacement detector and including at least one function based additionally on the output of said lens position detecting section;

a support point detecting switch with an electrical contact that is closed by pressing; and a selecting section which selects one of said functions depending on a state of said support point detecting switch;

said image movement correcting section effecting image movement correction in accordance with the correction amount calculated according to the selected function.

39. An image movement correcting device according to claim 38, characterized in that said support point detecting switch is disposed in an eyepiece portion.

40. An image movement correcting device of a photographing apparatus, comprising:

an angular displacement detector for detecting an angular fluctuation of a housing of the photographing apparatus and producing a corresponding output;

a photo-taking lens;

an image movement correcting section for correcting movement of an image formed through said photo-taking lens;

a lens position detecting section for detecting a position of said photo-taking lens in an optical axis direction and producing a corresponding output;

a calculation section for calculating image movement correction amounts corresponding to a predetermined direction of corrective movement, according to a plurality of different functions based on the output of said angular displacement detector and including at least one function based additionally on the output of said lens position detecting section;

a mounting detecting switch disposed on a tripod mounting portion of said photographing apparatus and detecting whether a tripod has been mounted on said photographing apparatus; and a selecting section which selects one of said functions depending on a state of said mounting detecting switch;

said image movement correcting section effecting image movement correction in accordance with the correction amount calculated according to the selected function.

41. An image movement correcting device of a photographing apparatus, comprising:

an angular displacement detector for detecting an angular fluctuation of a housing of the photographing apparatus and producing a corresponding output;

a photo-taking lens;

an image movement correcting section for correcting movement of an image formed through said photo-taking lens;

a lens position detecting section for detecting a position of said photo-taking lens in an optical axis direction and producing a corresponding output;

a calculation section for calculating image movement correction amounts corresponding to a predetermined direction of corrective movement, according to a plurality of different functions based on the output of said angular displacement detector and including at least one function based additionally on the output of said lens position detecting section;

a pressure-sensitive sensor disposed on an outer surface of the housing of the photographing apparatus and capable of specifying a position of a pressing point; and a selecting section which selects one of said functions depending on a state of said pressure-sensitive sensor;

said image movement correcting section effecting image movement correction in accordance with the correction amount calculated according to the selected function.

42. An image movement correcting device for a photo-taking apparatus, comprising:

angular displacement detecting means for detecting an angular fluctuation of a housing of the photographing apparatus and producing a corresponding output;

a photo-taking lens;

image movement correcting means for performing an image movement correction of an image projected onto a predetermined position in the housing through said photo-taking lens, image movement correction control means for controlling an amount of image movement correction by said image movement correcting means based on the output from said angular displacement detecting means;

lens position detecting means for detecting a position of said photo-taking lens in an optical axis direction and producing a corresponding output; and support point detecting means for detecting a position where the housing of said photographing apparatus is urged against an object and producing a corresponding output;

said image movement correction control means changing a correction amount based on the output from said angular displacement detecting means, in accordance with the output from said lens position detecting means and the output from said support point detecting means.

43. An image movement correcting device of a photographing apparatus, comprising:

angular displacement detecting means for detecting an angular fluctuation of a housing of the photographing apparatus and producing a corresponding output;

a photo-taking lens;

image movement correcting means for performing an image movement correction of an image projected onto a predetermined position in the housing through said photo-taking lens;

image movement correction control means for controlling an amount of image movement correction by said image movement correcting means based on the output from said angular displacement detecting means;

lens position detecting means for detecting a position of said photo-taking lens in an optical axis direction and producing a corresponding output;

support point detecting means for detecting a position where the housing of said photographing apparatus is urged against an object and producing a corresponding output; and modifying output generating means for generating a prescribed modifying output dependent upon the output of said lens position detecting means;

said image movement correction control means changing a correction amount based on the output from said angular displacement detecting means in accordance with the output from said lens position detecting means and the output from said support point detecting means when said support point detecting means generates an output, and in accordance with the prescribed modifying output when said support point detecting means is not capable of generating an output.

44. An image movement correcting device according to claim 43, including adjustment means for adjusting said modifying output.

45. An image movement correcting device according to claim 43, wherein said modifying output is based on a predetermined value.

46. An image movement correcting device of a photographing apparatus, comprising:

angular displacement detecting means for detecting an angular fluctuation of a housing of the photographing apparatus and producing a corresponding output;

a photo-taking lens;

a tripod seat for mounting a tripod thereon;

image movement correcting means for performing an image movement correction of an image projected onto an image field through said photo-taking lens; and image movement correction control means for controlling an amount of image movement correction by said image movement correcting means based on the output from said angular change detecting means;

said image movement correction control means determining whether the angular fluctuation of the housing has been caused by rotation about said tripod seat.

47. A method for correcting an image movement in a photographing apparatus, comprising:

a) producing information on an angular fluctuation of said photographing apparatus;

b) producing information on a central position of a rotational movement of the angular fluctuation;

c) calculating an image movement correction amount based on the information on the angular fluctuation and the information on the central position of the rotational movement of the angular fluctuation; and d) correcting the image movement in accordance with the image movement correction amount.

48. A method for correcting an image movement of a photographing apparatus, comprising:

a) producing information on an angular fluctuation of the photographing apparatus;

b) producing information on a distance from a principal point of a photo-taking lens of the photographing apparatus to an image plane of the photo-taking lens;

c) producing information on a distance from an object to be photographed to the principal point of the photo-taking lens;

d) producing information on a central position of rotational movement of the angular fluctuation;

e) calculating an image movement correction amount based on the information on the angular-fluctuation, the information on the distance from the principal point of the photo-taking lens to the image plane, the information on the distance from the object to the principal point of the photo-taking lens, and the information on the central position of the rotational movement of the angular fluctuation; and f) correcting the image movement in accordance with the image movement correction amount.

49. A photographing apparatus, comprising:

an angular displacement detector for detecting an angular fluctuation of a housing of the photographing apparatus and producing a corresponding output;

a photo-taking lens;

a support state discriminating section for discriminating a support state of the photographing apparatus;

an image movement calculating section for changing a calculation of movement of an image formed through said photo-taking lens based on output from said angular displacement detector, in accordance with a result discriminated by said support state discriminating section; and an image movement correcting section for correcting movement of an image formed through the photo-taking lens, in accordance with a result of the movement calculation.

50. A method for correcting an image movement in a photographing apparatus, comprising:

a) producing information on an angular fluctuation of the photographing apparatus;

b) producing information on a focal length of a photo-taking lens of the photographing apparatus;

c) producing information on an amount of axial movement of the photo-taking lens;

d) producing information on a central position of rotational movement of the angular fluctuation;

e) calculating an image movement correction amount from the information on the angular fluctuation, the information on the focal length of the photo-taking lens, the information on the amount of axial movement of the photo-taking lens, and the information on the central position of the rotational movement of the angular fluctuation; and f) correcting movement of an image formed through the photo-taking lens in accordance with the calculated correction amount.

51. A method of image movement correction in a photographing apparatus having a photo-taking lens and a variable vertical angle prism for correcting a movement of an image formed through the photo-taking lens, said method comprising setting a value of the vertical angle of said prism in accordance with the following relationship:

$$\xi = \frac{\theta}{n-1} \times \left(1 + \frac{b}{a}\right)$$

where $\xi$ is the set value of the vertical angle;

$\theta$ is a rotation angle of the photographing apparatus;

n is a refractive index of the variable vertical angle prism;

a is a distance between an object to be photographed and a principal point of the photo-taking lens; and b is a distance between the principal point and an imaging point of the photo-taking lens.

52. A method of image movement correction in a photographing apparatus having a photo-taking lens and a variable vertical angle prism for correcting a movement of an image formed through by the photo-taking lens, said method comprising setting a value of the vertical angle of said prism in accordance with the following relationship:

$$\xi = \frac{\theta}{n-1} \times \left(1 + \frac{b-m}{a}\right)$$

where $\xi$ is the set value of the vertical angle;

$\theta$ is a rotation angle of the photographing apparatus;

n is a refractive index of the variable vertical angle prism;

a is a distance between an object to be photographed and a principal point of the photo-taking lens; and b is a distance between the principal point and an imaging point of the photo-taking lens; and m is a distance between a rotation center of the photographing apparatus and the imaging point of the photo-taking lens.

53. A method of image movement correction in a photographing apparatus having a photo-taking lens shiftable along a direction perpendicular to an optical axis thereof to correct for image movement due to rotation of the photographing apparatus, said method comprising effecting the shifting of the photo-taking lens in accordance with the following relationship:

$$V = \theta \times \left\{ f + x \left(1 - \frac{m}{f+x}\right) \right\}$$

where

V is the amount of shifting of the photo-taking lens;

$\theta$ is a rotation angle of the photographing apparatus;

f is a focal length of the photo-taking lens;

x is an amount of axial movement of the photo-taking lens;

m is a distance between a rotation center of the photographing apparatus and an imaging point of the photo-taking lens.

54. A method of image movement correction in a photographing apparatus having photo-taking lens shiftable along a direction perpendicular to an optical axis thereof to correct for image movement due to rotation of the photographing apparatus, said method comprising effecting the shifting of the photo-taking lens in accordance with the following relationship:

$$V = \theta \times \left(f + \frac{x}{2}\right)$$

where

V is the amount of shifting of the photo-taking lens;

$\theta$ is a rotation angle of the photographing apparatus;

f is a focal length of the photo-taking lens; and x is an amount of axial movement of the photo-taking lens.

55. An image movement correction method for a photographing apparatus having a photo-taking lens and a variable vertical angle prism for correcting a movement of an image formed through the photo-taking lens, said method comprising setting a value of the vertical angle of said prism so as to satisfy the following relationship:

$$\xi > \frac{\theta}{n-1}$$

where $\xi$ is the set value of the vertical angle;

$\theta$ is a rotation angle of the photographing apparatus; and n is a refractive index of the variable vertical angle prism.

56. An image movement correction method according to claim 55, wherein the set value of the vertical angle satisfies the following relationship:

$$\xi \leq \frac{\theta}{n-1} \times \left(1 + \frac{b}{a}\right)$$

where a is a distance between an object to be photographed and a principal point of the photo-taking lens; and b is a distance between the principal point and an imaging point of the photo-taking lens.

57. An image movement correction method for detecting an amount of rotation of a photographing apparatus and correcting image movement due to the rotation of the photographing apparatus, said method comprising shifting a photo-taking lens or a portion thereof in a direction perpendicular to an optical axis so as to satisfy the following relationship:

$$V > \theta x f$$

where

V is the amount of shifting;

$\theta$ is a rotation angle of the photographing apparatus; and f is a focal length of the photo-taking lens.

58. An image movement correction method according to claim 57, wherein the amount of shifting satisfies the following relationship:

$$V < \theta x (f+x)$$

where x is an amount of axial movement of the photo-taking lens.

* * * * *